United States Patent
Takano

(10) Patent No.: US 9,832,721 B2
(45) Date of Patent: Nov. 28, 2017

(54) TERMINAL DEVICE, COMMUNICATION CONTROL DEVICE, AND COMMUNICATION CONTROL METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/890,553

(22) PCT Filed: Apr. 30, 2014

(86) PCT No.: PCT/JP2014/062005
§ 371 (c)(1),
(2) Date: Nov. 11, 2015

(87) PCT Pub. No.: WO2014/203630
PCT Pub. Date: Dec. 24, 2014

(65) Prior Publication Data
US 2016/0119863 A1  Apr. 28, 2016

(30) Foreign Application Priority Data
Jun. 19, 2013  (JP) .................... 2013-128612

(51) Int. Cl.
*H04W 48/20* (2009.01)
*H04W 4/00* (2009.01)
(Continued)

(52) U.S. Cl.
CPC .......... *H04W 48/20* (2013.01); *H04W 4/005* (2013.01); *H04W 16/32* (2013.01); *H04W 48/16* (2013.01); *H04W 84/045* (2013.01)

(58) Field of Classification Search
CPC ..... H04W 48/20; H04W 4/005; H04W 48/16; H04W 84/045
See application file for complete search history.

(56) References Cited

U.S. PATENT DOCUMENTS 7,782,964 B1 * 8/2010 Talley ................. H04L 27/0006
375/259
8,958,367 B2 * 2/2015 Jung ..................... H04W 48/16
370/328

(Continued)

FOREIGN PATENT DOCUMENTS

| EP | 2 603 054 A1 | 6/2013 |
|---|---|---|
| JP | 2002-118873 A | 4/2002 |
| JP | 2010-263513 A | 11/2010 |
| WO | WO 2009/044620 A1 | 4/2009 |
| WO | WO 2011/052190 A1 | 5/2011 |

OTHER PUBLICATIONS

International Search Report dated Jul. 29, 2014 in PCT/JP2014/062005.
(Continued)

*Primary Examiner* — Charles Appiah
*Assistant Examiner* — Margaret G Mastrodonato
(74) *Attorney, Agent, or Firm* — Oblon, McClelland, Maier & Neustadt, L.L.P.

(57) ABSTRACT

A terminal device including: an acquisition unit configured to acquire information on a small cell, a portion of or an entirety of the small cell overlapping a macro cell, and the macro cell; and a communication control unit configured to perform an access procedure for connection to a base station of the small cell when the terminal device is not connected to any base station. The device can suppress an increase in the load on the base station of the macro cell.

15 Claims, 25 Drawing Sheets

(51) Int. Cl.
*H04W 16/32* (2009.01)
*H04W 48/16* (2009.01)
*H04W 84/04* (2009.01)

(56) References Cited

U.S. PATENT DOCUMENTS

| | | | |
|---|---|---|---|
| 2010/0210258 A1* | 8/2010 | Nylander | H04W 16/10 455/422.1 |
| 2010/0240386 A1* | 9/2010 | Hamabe | H04W 72/085 455/452.2 |
| 2010/0285812 A1 | 11/2010 | Murakami | |
| 2011/0312328 A1 | 12/2011 | Choi et al. | |
| 2013/0005350 A1* | 1/2013 | Campos | H04W 48/18 455/456.1 |
| 2014/0161049 A1* | 6/2014 | Viorel | H04W 74/0833 370/329 |

OTHER PUBLICATIONS

"Identification of MTC Devices" CMCC, 3GPP TSG-RAN WG2 Meeting #71, R2-104551, Aug. 2010, 3 Pages.

"3rd Generation Partnership Project; Technical Specification Group Radio Access Network; Scenarios and Requirements for Small Cell Enhancements for E-UTRA and E-UTRAN" Release 12, 3GPP TR 36.932 V1.0.0, Dec. 2012, 14 Pages.

Extended European Search Report dated Mar. 17, 2017 in Patent Application No. 14812940.6.

Partial Supplementary European Search Report dated Dec. 12, 2016 in Patent Application No. 14812940.6.

3rd Generation Partnership Project; Technical Specification Group Radio Access Network; Evolved Universal Terrestrial Radio Access (E-UTRA); User Equipment (UE) procedures in idle mode (Release 11), 3GPP TS 36.304 V11.3.0, XP050692236, 2013, 34 Pages.

\* cited by examiner

TERMINAL DEVICE, COMMUNICATION CONTROL DEVICE, AND COMMUNICATION CONTROL METHOD

TECHNICAL FIELD

The present disclosure relates to a terminal device, a communication control device, and a communication control method.

BACKGROUND ART

At present, there is a concern of data traffic increasing in cellular systems due to popularization of smartphones. For this reason, it is increasingly important for cellular service providers to increase communication capacities of the cellular systems.

To increase communication capacities, for example, service providers dispose small cells such as pico cells or femto cells in macro cells. Accordingly, the service provides can obtain new communication capacities. To use such small cells, various examinations have been made.

For example, Non-Patent Literature 1 discloses various disposition scenarios of small cells and use of different frequency bands in macro cells and small cells.

CITATION LIST

Patent Literature

Non-Patent Literature 1: 3GPP TR 36.932 V1. 0.0 (2012-12) "3rd Generation Partnership Project; Technical Specification Group Radio Access Network; Scenarios and Requirements for Small Cell Enhancements for E-UTRA and E-UTRAN (Release 12)"

SUMMARY OF INVENTION

Technical Problem

Conversely, in long term evolution (LTE) and LTE-Advanced, when a piece of user equipment (UE) is in a radio resource control (RRC) idle state (for example, after the UE has been powered up), in order to perform transition from the RRC idle state to an RRC connected state, the UE performs a random access procedure, for example. Then, the UE determines in which component carrier (CC) the random access procedure is to be performed. In other words, to which eNB the UE is to be connected is determined by the UE.

However, in a case in which a macro cell and a pico cell are present, if a number of UEs perform random access procedures in the CC of the macro cell, the signaling for establishing connection may increase in the CC of the macro cell. As a result, from the viewpoint of radio resource and processing, a concern that there will be a large load on the macro eNB is met.

Accordingly, it is desirable that a system that enables suppression of increase in the load on the base station of the macro cell be provided, for example.

Solution to Problem

According to the present disclosure, there is provided a terminal device including: an acquisition unit configured to acquire information on a small cell, a portion of or an entirety of the small cell overlapping a macro cell, and the macro cell; and a communication control unit configured to perform an access procedure for connection to a base station of the small cell when the terminal device is not connected to any base station.

According to the present disclosure, there is provided an information processing device that controls a terminal device, the information processing device including: a memory configured to store a predetermined memory; and one or more processors capable of executing the predetermined program. The predetermined program is a program that causes acquiring information on a small cell, a portion of or an entirety of the small cell overlapping a macro cell, and the macro cell, and performing an access procedure for connection to a base station of the small cell when the terminal device is not connected to any base station.

According to the present disclosure, there is provided a terminal device including: an acquisition unit configured to acquire information according to a state of the terminal device; and a communication control unit configured to, in an access procedure for connection to a base station, provide a message including the information to the base station when the terminal device is not connected to any base station.

According to the present disclosure, there is provided an information processing device that controls a terminal device, the information processing device including: a memory configured to store a predetermined memory; and one or more processors capable of executing the predetermined program. The predetermined program is a program that causes acquiring information according to a state of the terminal device, and in an access procedure for connection to a base station, providing a message including the information to the base station when the terminal device is not connected to any base station.

According to the present disclosure, there is provided a communication control device including: an acquisition unit configured to, in an access procedure for connection to a terminal device, when a message including information according to a state of the terminal device is provided by the terminal device, acquire the information; and a communication control unit configured to determine whether to permit connection of the terminal device on a basis of the information.

According to the present disclosure, there is provided a communication control method including: acquiring, in an access procedure for connection to a terminal device, when a message including information according to a state of the terminal device is provided by the terminal device, the information; and determining whether to permit connection of the terminal device on a basis of the information.

According to the present disclosure, there is provided a communication control device including: an acquisition unit configured to acquire congestion information on a congestion state of each of a plurality of frequency bands; and a communication control unit configured to, on a basis of the congestion information, control priorities of measurements of the plurality of frequency bands performed by the terminal device.

According to the present disclosure, there is provided a communication control method including: acquiring congestion information on a congestion state of each of a plurality of frequency bands; and controlling, on a basis of the congestion information, priorities of measurements of the plurality of frequency bands performed by the terminal device.

According to the present disclosure, there is provided a terminal device including: an acquisition unit configured to acquire information on priorities that are priorities of measurements of a plurality of frequency bands performed by the terminal device and that are determined on a basis of a congestion state of each of the plurality of frequency bands; and a communication control unit configured to control execution of the measurements of the plurality of frequency bands in accordance with the priorities.

According to the present disclosure, there is provided an information processing device that controls a terminal device, the information processing device including: a memory configured to store a predetermined memory; and one or more processors capable of executing the predetermined program. The predetermined program is a program that causes acquiring information on priorities that are priorities of measurements of a plurality of frequency bands performed by the terminal device and that are determined on a basis of a congestion state of each of the plurality of frequency bands, and controlling execution of the measurements of the plurality of frequency bands in accordance with the priorities.

Advantageous Effects of Invention

As described above, according to the present disclosure, an increase in the load on the base station of the macro cell can be suppressed.

DESCRIPTION OF EMBODIMENTS

Figure 1:
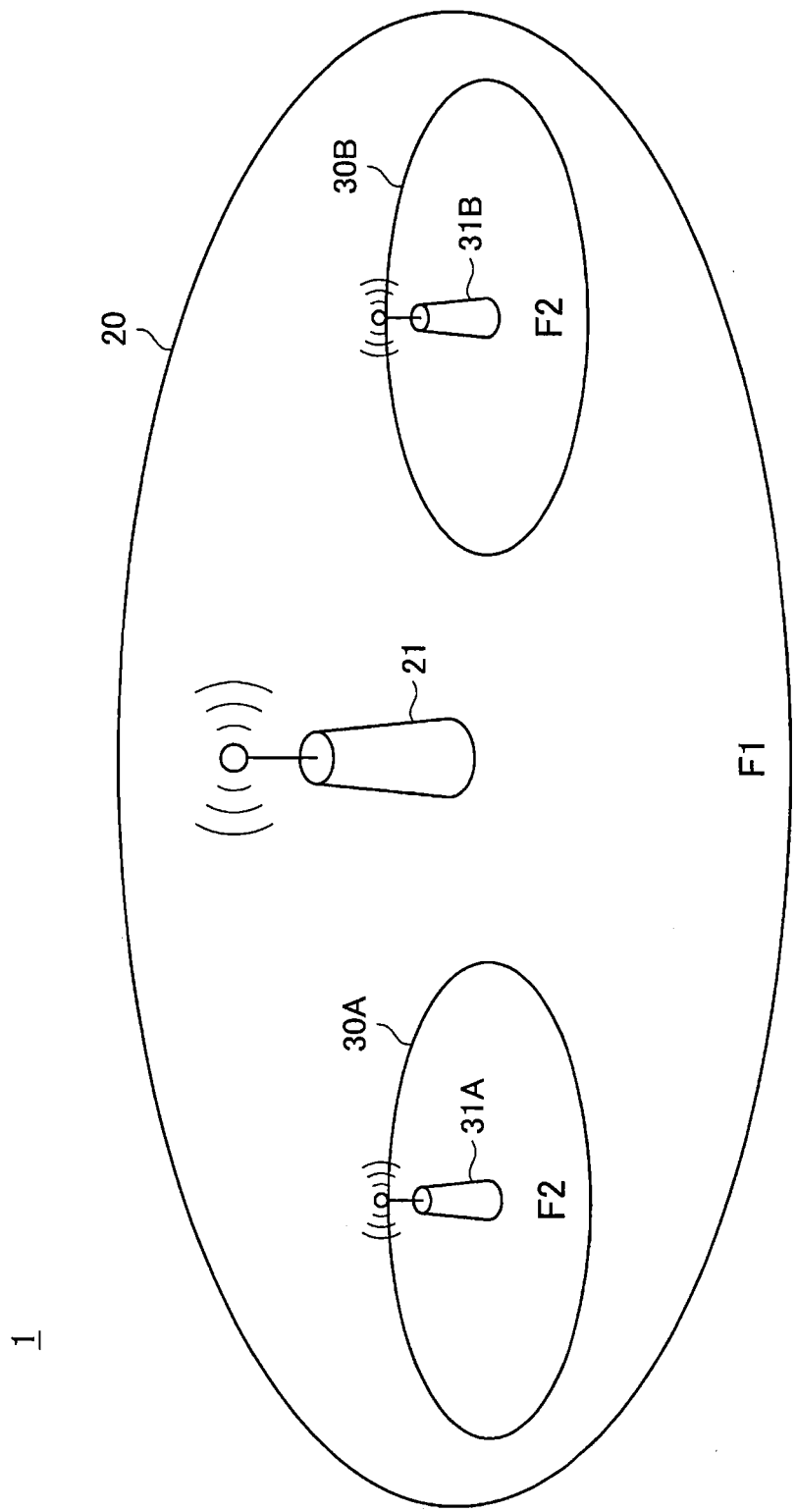
FIG. 1 is an explanatory diagram illustrating a first scenario of small cells.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Introduction
2. Configuration of communication system
3. First Embodiment
3.1 Overview
3.2 Configuration of UE
3.3 Configuration of pico eNB
3.4 Flow of process
4. Second Embodiment
4.1 Overview
4.2 Configuration of UE
4.3 Configuration of macro NB
4.4 Flow of process
5. Third Embodiment
5.1 Overview
5.2 Configuration of UE
5.3 Configuration of macro eNB
5.4 Flow of process 6. Fourth Embodiment
6.1 Overview
6.2 Configuration of macro NB
6.3 Configuration of UE
6.4 Flow of process
7. Application examples
7.1. Applications related to eNB
7.2. Applications related to UE
9. Conclusion 1. Introduction First, carrier aggregation, measurement, and a small cell will be described with reference to FIGS. 1 and 2.

(Carrier Aggregation of Release 10)

Component Carrier

In carrier aggregation of Release 10, up to five component carriers (CCs) are bundled and used by a user equipment (UE). Each CC is a bandwidth of up to 20 MHz. In carrier aggregation, CCs continuing in a frequency direction are used in some cases and CCs separated in the frequency direction are used in some cases. When the CCs distant on the frequency axis are used, a propagation state can be considerably different between the used CCs. In carrier aggregation, the CCs to be used can be set for each UE.

Primary CC and Secondary CC

In carrier aggregation, one of the plurality of CCs used by the UE is a special CC. The one special CC is referred to as a primary component carrier (PCC). Of the plurality of CCs, the remaining CCs are referred to as secondary component carriers (SCCs).

The PCC may differ depending on the UE. Since the PCC is the most important CC among the plurality of CCs, the CC for which communication quality is the stablest is preferable. Which CC is used as the PCC actually depends on the way in which they are installed.

The CC with which a UE initially establishes connection is the PCC for the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE cannot use only the SCC, but necessarily uses one PCC.

The PCC is used to control connection (for example, setup of the connection or maintenance of the connection). Even when a UE uses a plurality of CCs, the UE does not enter a connection state with each CC. The UE enters the connection state with only the PCC.

The PCC is also referred to as a primary cell. The SCC is also referred to as a secondary cell.

Cross Carrier Scheduling

As the CCs, there are CCs in which a physical downlink control channel is present and CCs in which the PDCCH is not present. At least, the PDCCH is present in the PCC. When the PDCCH is not present in a certain CC, control information (scheduling information) for this CC is transmitted with the PDCCH of another CC. This form is referred to as cross carrier scheduling.

In each search space of the PDCCH, there are a plurality of pieces of downlink control information (DCI). In the DCI, there is a 3-bit carrier identity field (CIF). The CIF designates another CC. That is, in the DCI, there is control information of the CC designated by the CIF.

One CC is controlled not by a plurality of CCs, but is necessarily controlled by one CC. In other words, the control information for one CC is not distributed and disposed in a plurality of CCs, but is disposed in one CC. The UE is notified in advance whether there is the CIF in the CC by RRC signaling.

ePDCCH

In Release 11, the problem that the region of the PDCCH lacks was closed up. Accordingly, a new control region, an enhanced PDCCH (ePDCCH) was developed. It has been decided that the ePDCCH is to be disposed in the region of the PDSCH of the related art.

(Measurement)

Measurement refers to measurement of quality of a transmission line. The measurement is performed by a UE. Then, a result of the measurement is reported to an evolved node B (eNB) by the UE.

Measurement Targets

As measurement targets, there are 3 kinds of frequency bands. First, a frequency band used by a serving cell is a measurement target. That is, the frequency band is a frequency band used for radio communication by a UE during connection to an eNB. In the case of carrier aggregation, a PCC and an SCC are measurement targets. Second, a frequency band present in a whitelist included in system information transmitted by an eNB is a measurement target frequency band. Third, a frequency band detected by a UE is a measurement target frequency band.

RSRP and CRS

Representative downlink measurement results are reference signal received power (RSRP) and reference signal received Quality (RSRQ). The RSRP and the RSRQ are values obtained by measurement using a cell specific reference symbol (CRS). Specifically, the RSRP is a result obtained by measuring the power of the CRS. The RSRQ is calculated from the RSRP and a received signal strength indicator (RSSI). Normally, a UE reports both of the RSRP and the RSRQ.

Purpose to Use Measurement Results

The RSRP and the RSSQ are used for cell selection, cell reselection, and handover.

For example, when a UE is an RRC connection state, the measurement results reported by the UE are used, for example, for a handover decision. That is, an eNB performs the handover decision based on the measurement results reported by the UE.

For example, when the UE is in an RRC idle state, the measurement results reported by the UE are used, for example, to select a cell. That is, the UE performs measurement even when the UE is in a radio resource control (RRC) idle state. Accordingly, the UE can select an optimum cell or eNB for receiving information with a paging channel and select an optimum cell or eNB when random access is performed.

Report Events

A predetermined event triggers reporting of the measurement results by the UE. That is, when a predetermined event occurs (when a condition of the predetermined event is satisfied), the UE reports the measurement results to the eNB. In Release 8, 5 kinds of events, events A1 to A5, are decided as the predetermined events. Further, an event A6 for carrier aggregation is decided as the predetermined event.

For example, a condition of the event A1 is that the quality (or example, the RSRP or the RSRQ) of a serving cell is better than a threshold value. A condition of the event A2 is that the quality of a serving cell is worse than the threshold value. A condition of the event A3 is that the quality of a neighbor cell is better than the quality of a serving cell by the threshold value or more. A condition of the event A4 is that the quality of a neighbor cell is better than the threshold value. A condition of the event A5 is that the quality of a serving cell is worse than a first threshold value and the quality of a neighbor cell is better than a second threshold value.

When carrier aggregation is used, a condition of the event A3 is that the quality of a neighbor cell is better than the quality of a primary cell by a threshold value or more. A condition of the event A5 is that the quality of a primary cell is worse than the first threshold value and the quality of a neighbor cell is better than the second threshold value. A condition of the event A6 is that the quality of a neighbor cell is better than the quality of a secondary cell by the threshold value or more.

(Small Cell)

Transmission Power

The transmission power of a small cell is less than the transmission power of a base station of a macro cell. As a result, the radius of the small cell is less than the radius of the macro cell.

Pico eNB of Release 10

In LTE, specifically, a small cell referred to as a pico cell is used. In LTE, a base station is referred to as an evolved Node B (eNB). A base station of the pico cell is referred to as a pico eNB. A base station of a macro cell is referred to as a macro eNB.

In Release 10 of the Third Generation Partnership Project (3GPP), a pico eNB includes an analog unit and an antenna unit connected to a macro eNB by an optical fiber and is referred to as a remote radio head (RRH). The macro eNB and the pico eNB use the same frequency band. The pico cell partially or entirely overlaps with the macro cell. Such a disposition form of the base stations is referred to as a heterogeneous network (Het-Net). In the Het-Net, since it is important to reduce interference between the macro eNB and the pico eNB, methods for reducing the interference have been actively discussed in the 3GPP. As one of the methods, an examination of providing an almost blank subframe (ABS) by which the macro eNB stops most of the transmission has been made.

Small Cell in Release 12

A small cell examined in Release 12 is also, for example, a pico cell. This point is the same between Release 12 and Release 10. On the other hand, Release 12 describes a scenario in which a macro cell and a pico cell use different frequency bands. For example, a macro eNB uses a frequency band lower by about 2 GHz and a pico eNB uses a frequency band higher by about 5 GHz.

Since the macro cell is broader than the pico cell, it has also been examined that the macro eNB transmits a control signal instead of the pico eNB.

Two scenarios for a small cell have been examined. Hereinafter, specific examples of this point will be described with reference to FIGS. 1 and 2.

FIG. 1 is an explanatory diagram illustrating a first scenario (scenario A) of small cells. In the present specification, the first scenario is referred to as scenario A. Scenario A is a scenario in which a UE is located simultaneously in coverages of both of a macro cell and a small cell. Referring to FIG. 1, a macro cell 20 and a macro eNB 21 are illustrated. A pico cell 30A and a pico eNB 31A, and a pico cell 30B and a pico eNB 31B are also illustrated. The macro eNB 21 uses a frequency band F1 and the pico eNBs 31 use a frequency band F2. In this case, in scenario A, the UE uses the frequency band F1 to perform radio communication with the macro eNB 21 and uses the frequency band F2 to perform radio communication with the pico eNBs 31. Scenario A is, for example, a scenario in which the macro eNB 21 is used outdoors and the pico eNBs 31 are used outdoors or indoors.

Figure 2:
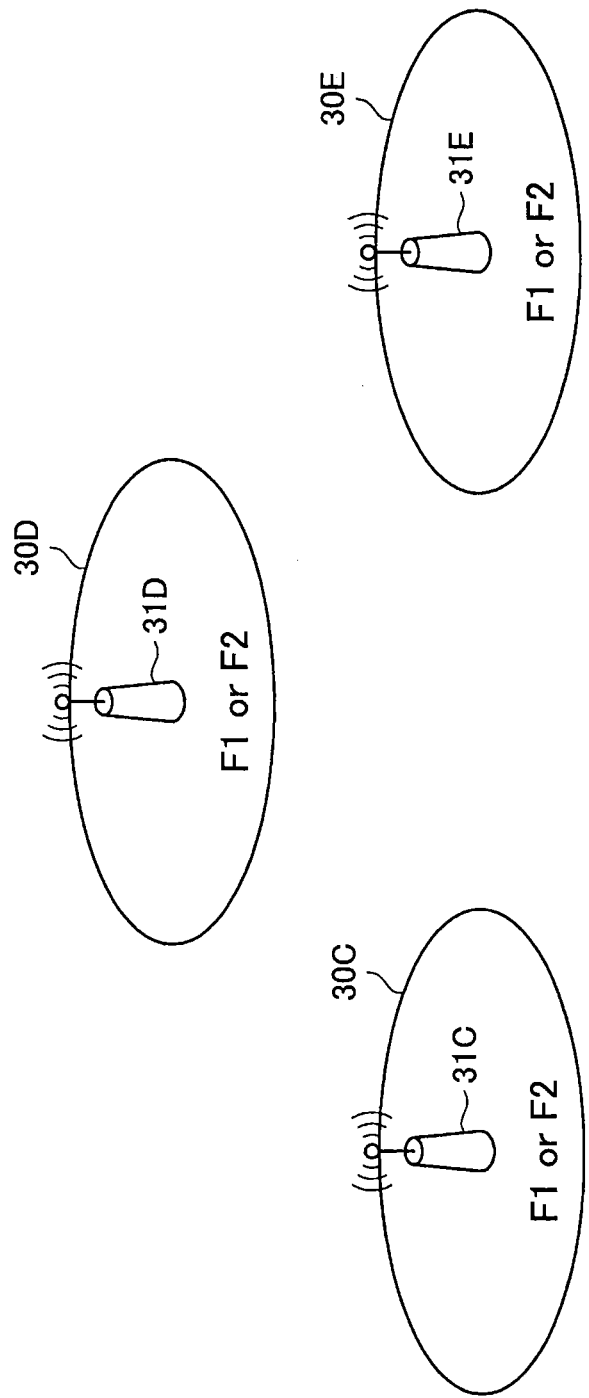
FIG. 2 is an explanatory diagram illustrating a second scenario of small cells.

FIG. 2 is an explanatory diagram illustrating a second scenario (scenario B) of small cells. In the present specification, the second scenario is referred to as scenario B. Scenario B is a scenario in which a UE is not located simultaneously in coverages of both of a macro cell and a small cell. Specifically, scenario B is a scenario in which the UE is located in the coverage of the small cell, but is not located in the coverage of the macro cell. Referring to FIG. 2, a pico cell 30c and a pico eNB 31C, a pico cell 30D and a pico eNB 31D, and a pico cell 30E and a pico eNB 31E are illustrated. In scenario B, the pico eNBs 31 uses a frequency band F1 or a frequency band F2. For example, in scenario B, the pico eNBs 31 are considered to also use the frequency band F2. In this case, in scenario B, the UE can use the frequency band F2 to perform radio communication with the pico eNBs 31. In scenario B, whether the pico cells 30 overlap with a macro cell is not mentioned.

Relation Between Scenario A and Scenario B

In scenario A, by using a CC used in the macro cell as the PCC, it is possible to reduce a frequency of handover in which much signaling is necessary. As a result, it is possible to reduce loads on the UE and the eNB.

When the pico eNB is disposed indoors, no radio wave of the macro eNB arrives indoors. As a result, the scenario of the small cells is considered to be scenario B rather than scenario A. Thus, when one UE is focused on, for example, when one UE goes back and forth between indoors and outdoors, a scenario for the one UE can be switched between scenario A and scenario B. In this way, the switching between scenario A and scenario B can occur for each UE.

Relation Between Scenario of Small Cell and Carrier Aggregation

In each of a macro cell and a pico cell, a plurality of CCs are considered to be used. In this case, a combination of the CCs for the macro cell and the CCs for the pico cell is considered to be used in carrier aggregation.

In scenario A, the CCs for the macro cell are considered to be used as the PCC. On the other hand, in scenario B, since the CCs for the macro cell are not used, a CC for the pico cell is used as the PCC.

Figure 3:
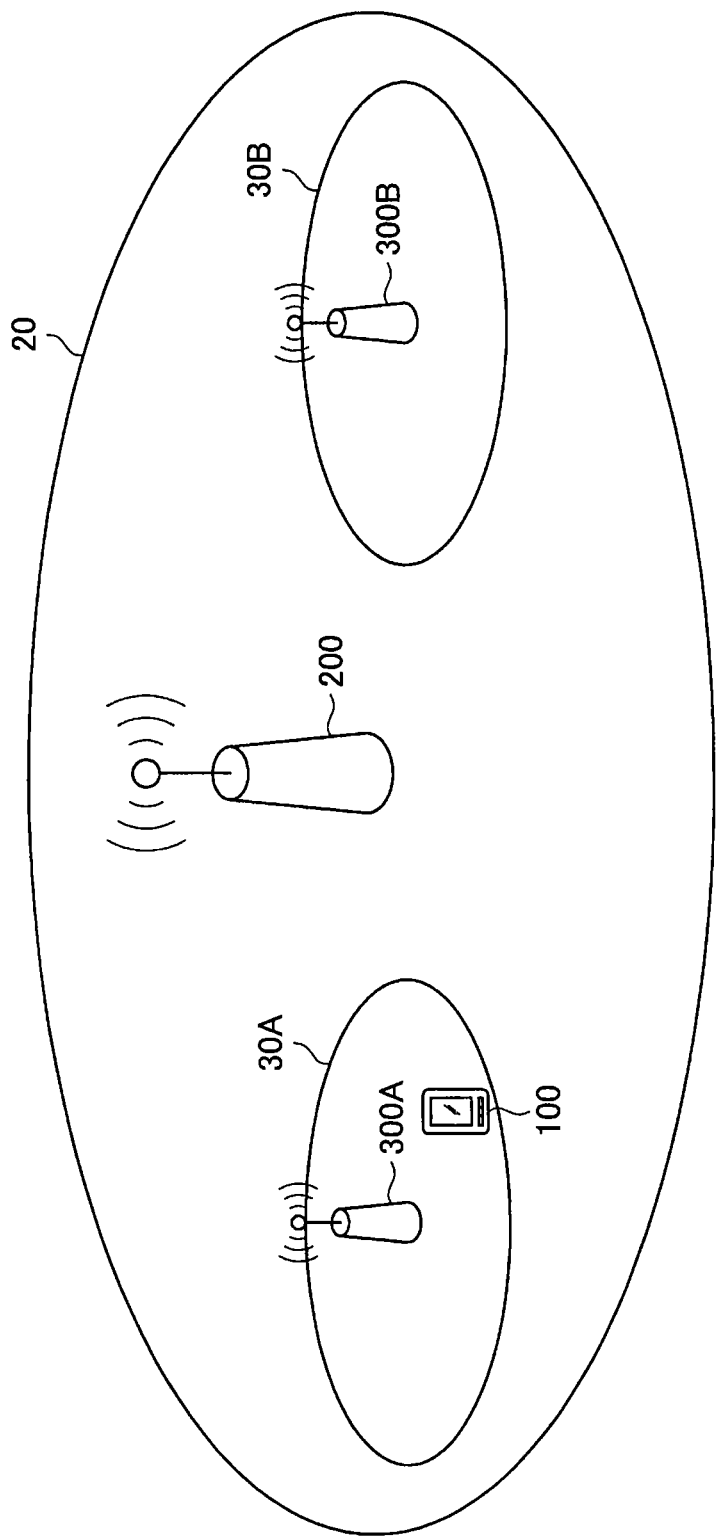
FIG. 3 is an explanatory diagram illustrating an example of a schematic configuration of a communication system according to an embodiment of the present disclosure.

2. Schematic Configuration of Communication System According to Embodiment of Present Disclosure Next, a schematic configuration of a communication system 1 according to an embodiment of the present disclosure will be described with reference to FIG. 3. FIG. 3 is an explanatory diagram illustrating an example of the schematic configuration of a communication system 1 according to the embodiment of the present disclosure. Referring to FIG. 3, the communication system 1 includes a UE 100, a macro eNB 200, and a pico eNB 300. In this example, the communication system 1 is a system conforming to LTE, LTE-Advanced, or a compliant communication scheme.

(UE 100)

The UE 100 performs the radio communication with the macro eNB 200 when the UE 100 is located in the macro cell 20. Further, the UE 100 performs the radio communication with the pico eNB 300 when the UE 100 is located in the pico cell 30. Note that the macro cell 20 partially or entirely overlaps the pico cell 30. In other words, a portion of or the entire pico cell 30 overlaps the macro cell 20.

For example, the UE 100 can perform the radio communication using a plurality of frequency bands. More specifically, for example, the UE 100 can use one main frequency band and one or more auxiliary frequency bands to perform the radio communication. That is, the UE 100 can support the carrier aggregation and use one PCC and one or more SCCs to perform the radio communication.

As a specific form of the carrier aggregation, for example, the UE 100 can use a plurality of CCs for the macro cell 20 to perform the radio communication with the macro eNB 200. For example, the UE 100 can use the plurality of CCs for the pico cell 30 to perform the radio communication with the pico eNB 300. In the present description, the CC for the macro cell 20 (the CC that is used in the macro cell 20) is referred to as "CC for the macro cell" and the CC for the pico cell 30 (the CC that is used in the pico cell 30) is referred to as "CC for the pico cell".

Furthermore, the UE 100 is also capable of performing radio communication with a macro eNB 200 using one or more CCs for the macro cell while performing radio communication with the pico eNB 300 using one or more CCs for the pico cell, for example. In other words, the UE 100 supports carrier aggregation that uses a combination of the CCs for the macro cell and the CCs for the pico cell.

(Macro eNB 200)

The macro eNB 200 performs radio communication with the UE 100 located inside the macro cell 20.

For example, the macro eNB 200 performs radio communication using a plurality of frequency bands. The plurality of frequency bands are a plurality of component carriers (CCs). As an example, each of the plurality of CCs (in other words, the plurality of CCs for the macro cell) used by the macro eNB 200 is a bandwidth in the 2 MHz band.

Furthermore, for example, the macro eNB 200 supports carrier aggregation. In other words, the macro eNB 200 is capable of using a plurality of CCs for the macro cell when performing radio communication with a single UE 100.

(Pico eNB 300)

The pico eNB 100 performs radio communication with the UE 100 located inside the pico cell 30. A portion or the entire pico cell 30 overlaps the macro cell 20.

For example, the pico eNB 300 performs radio communication using a plurality of frequency bands. The plurality of frequency bands are a plurality of component carriers (CCs). For example, each of the plurality of CCs (in other words, the plurality of CCs for the pico cell) used by the pico eNB 300 is a bandwidth that is in a frequency band higher than the frequency band in which the CCs for the macro cell exists. As an example, each of the plurality of CCs for the pico cell is a bandwidth in the 5 MHz band.

Furthermore, for example, the pico eNB 300 supports carrier aggregation. In other words, the pico eNB 300 is capable of using a plurality of CCs for the pico cell when performing radio communication with a single UE 100.

3. First Embodiment

Referring to FIGS. 4 to 8, a first embodiment of the present disclosure will be described next.

<3.1. Overview>

(Problem)

In LTE and LTE-Advanced, when a piece of UE is in a RRC idle state (for example, after the UE has been powered up), in order to perform transition from the RRC idle state to an RRC connected state, the UE performs a random access procedure, for example. Then, the UE determines in which CC the random access procedure is to be performed. In other words, to which eNB the UE is to be connected is determined by the UE.

However, in a case in which a macro cell and a pico cell are present, if a number of UEs perform random access procedures in the CC of the macro cell, the signaling for establishing connection may increase in the CC of the macro cell. As a result, from the viewpoint of radio resource and processing, a concern that there will be a large load on the macro eNB is met.

Note that the random access procedure with the UE may be forbidden or reduced in the CCs of the macro cell by access barring. However, access barring cannot forbid an access of a specific UE. For example, it is not possible with access barring to allow a UE that needs to be connected to the macro eNB to be connected to the macro eNB while not allowing a UE that does not need to be connected to the macro eNB to be connected to the macro eNB.

Accordingly, the first embodiment is capable of suppressing increase in the load on the base station of the macro cell, for example.

(Solution)

According to the first embodiment, the UE 100 performs an access procedure to connect to the pico eNB 300 when not connected to any of the eNBs.

With the above, the UE 100 is connected to the pico eNB 300 first. Accordingly, the network side can determine the UE 100 that is to be connected to the macro eNB 200. Accordingly, connection of the UE 100 to the macro eNB 200 can be restricted. Furthermore, with the restriction, the increase in signaling in the CCs of the macro cell 20 for establishing a connection is suppressed and, as a result, the increase in load on the macro eNB 200 can be suppressed. As described above, the first embodiment is capable of suppressing increase in load on the macro eNB 200.

<3.2. Configuration of UE>

Figure 4:
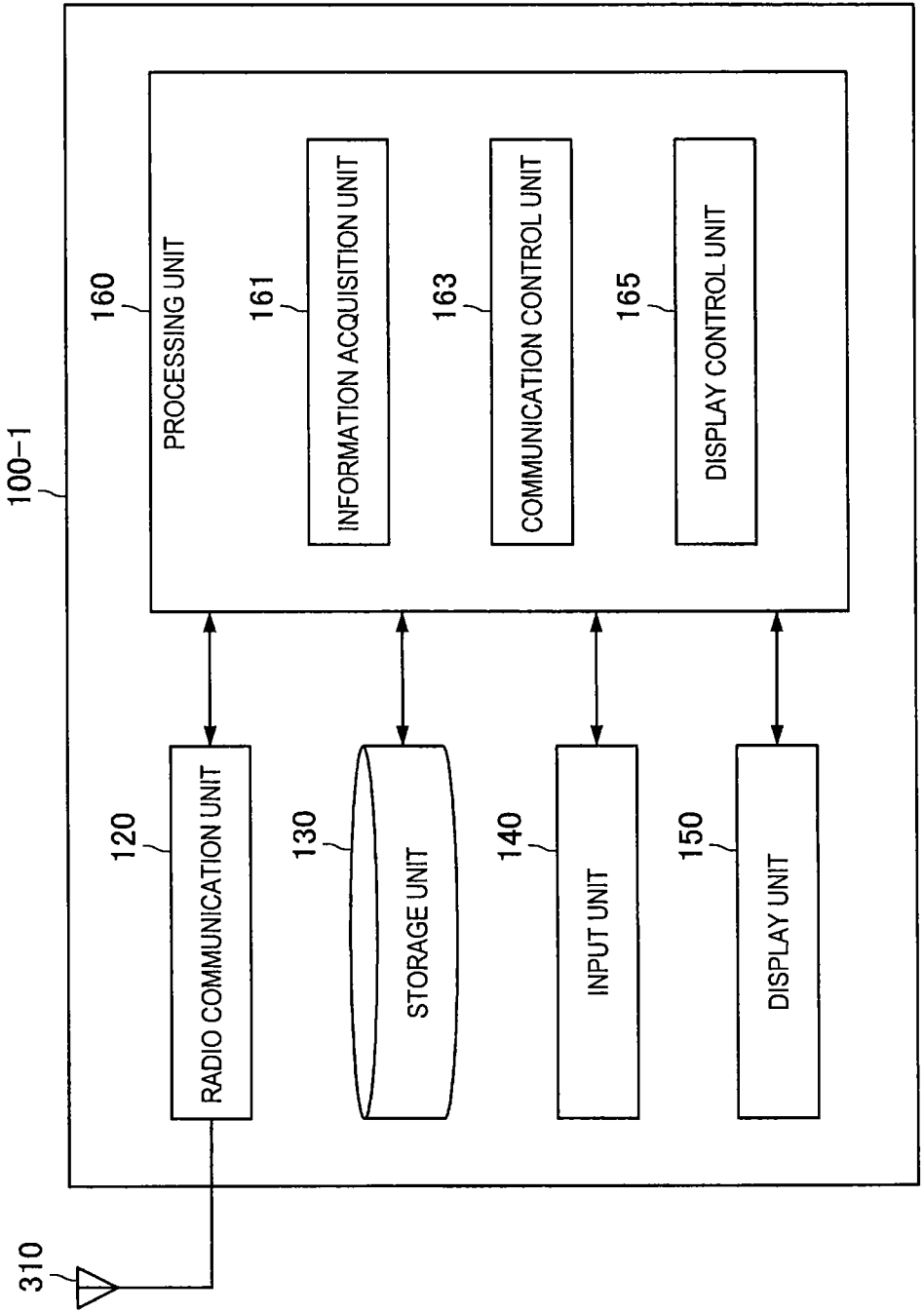
FIG. 4 is a block diagram illustrating an example of the configuration of a UE according to a first embodiment.

Next, the configuration of the UE 100-1 according to the first embodiment will be described with reference to FIG. 4. FIG. 4 is a block diagram illustrating an example of the configuration of the UE 100-1 according to the first embodiment. Referring to FIG. 4, the UE 100-1 includes an antenna unit 110, a radio communication unit 120, a storage unit 130, an input unit 140, a display unit 150, and a processing unit 160.

(Antenna Unit 110)

The antenna unit 110 receives a radio signal and outputs the received radio signal to the radio communication unit 120. The antenna unit 110 transmits a transmission signal output by the radio communication unit 120.

(Radio Communication Unit 120)

The radio communication unit 120 performs radio communication with the macro eNB 200 when the UE 100 is located in the macro cell 20. The radio communication unit 120 performs radio communication with the pico eNB 300 when the UE 100 is located in the pico cell 30.

For example, the radio communication unit 120 uses the plurality of frequency bands (that is, the CCs) to perform the radio communication. Specifically, for example, the radio communication unit 320 uses the plurality of CCs for the macro cell to perform the radio communication with the macro eNB 100. For example, the radio communication unit 120 uses the plurality of CCs for the pico cell to perform the radio communication with the pico eNB 200. For example, while the radio communication unit 120 uses one or more CCs for the macro cell to perform the radio communication with the macro eNB 200, the radio communication unit 120 uses one or more CCs for the pico cell to perform the radio communication with the pico eNB 300.

(Storage Unit 130)

The storage unit 130 stores a program and data for an operation of the UE 100.

(Input Unit 140)

The input unit 140 receives an input by a user of the UE 100. Then, the input unit 140 supplies an input result to the processing unit 160.

(Display Unit 150)

The display unit 150 displays an output screen (that, an output image) from the UE 100. For example, the display unit 150 displays the output screen according to control by the processing unit 160 (a display control unit 165).

(Processing Unit 160)

The processing unit 160 supplies various functions of the UE 100-1. The processing unit 160 includes an information acquisition unit 161, a communication control unit 163, and the display control unit 165.

(Information Acquisition Unit 161)

The information acquisition unit 161 acquires information necessary for control by the communication control unit 163. For example, the information acquisition unit 161 acquires information from another device via the radio communication unit 120. For example, the information acquisition unit 161 acquires information stored in the storage unit 130.

Cell Information

In particular, in the first embodiment, the information acquisition unit 161 acquires information (hereinafter, referred to as "cell information") on the macro cell 20 and the pico cell 30.

For example, the cell information includes information on the frequency band used in the cell. The frequency band is a component carrier (CC), for example.

Specifically, the information acquisition unit 161 acquires information (hereinafter, referred to as "CC information") on one or more CCs for the macro cell and one or more CCs for the pico cell. As an example, the CC information described above includes information for identifying each CC. Furthermore, as another example, the CC information described above includes information indicating whether each CC is a CC for the macro cell or a CC for the pico cell. Furthermore, as another example, the CC information described above includes information on a physical random access channel (PRACH) of the CC.

Note that the cell information (CC information) described above is, for example, information included in the system information.

Information According to State of UE

Furthermore, the information acquisition unit 161 acquires the above-described information according to the state of the UE 100-1. Information according to the state of the UE 100-1 will be described in detail later.

(Communication Control Unit 163)

The communication control unit 163 performs control related to the radio communication performed by the UE 100-1.

Access Procedure

In particular, in the first embodiment, when the UE 100-1 is not connected to any of the eNBs, the communication control unit 163 performs an access procedure for connection with the pico eNB 300-1. In other words, when the UE 100-1 is not connected to any of the eNBs, the communication control unit 163 does not perform any access procedure for connection with the macro eNB 200-1. The above access procedure is, for example, a random access procedure.

More specifically, for example, when the UE 100-1 is in the RRC idle state, the communication control unit 163 does not perform any random access procedure in the CC for the macro cell and performs a random access procedure in the CC for the pico cell. In other words, when the UE 100-1 is in the RRC idle state, the communication control unit 163 makes the radio communication unit 120 transmit a random access preamble through the PRACH of the CC for the pico cell. Furthermore, the communication control unit 163 performs RRC connection establishment in the CC for the pico cell. As a result, the communication control unit 163 performs transition from the RRC idle state to the RRC connected state and the above-described CC for the pico cell becomes the primary component carrier (PCC) for the UE 100-1.

With the above, the UE 100-1 is connected to the pico eNB 300-1 first. Accordingly, the network (for example, the pico eNB 300-1) side can determine the UE 100-1 that is to be connected to the macro eNB 200. Accordingly, connection of the UE 100 to the macro eNB 200 can be restricted. Furthermore, with the restriction, the increase in signaling in the CCs of the macro cell for establishing a connection is suppressed and, as a result, the increase in load on the macro eNB 200 can be suppressed. As described above, it is possible to suppress increase in load on the macro eNB 200.

Provision of Information

For example, after the UE 100-1 is connected to the pico eNB 300-1, the communication control unit 163 provides information according to the state of the UE 100-1 to the pico eNB 300-1. Specifically, for example, the communication control unit 163 makes the radio communication unit 120 transmit the above-described information according to the state of the UE 100-1 to the pico eNB 300-1.

Movement State Information

As a first example, the above-described information according to the state of the UE 100-1 includes information (hereinafter, "movement state information") on the movement state of the UE 100-1. As an example, the movement state information is information on a moving speed of the UE 100-1.

With the above, the network side is capable of, according to the movement state of the UE 100-1, determining the UE 100-1 that is to be connected to the macro eNB 200. Accordingly, for example, in a case in which the moving speed of the UE 100-1 is high, the UE 100-1 can be made to use the CC for the macro cell as the PCC. As a result, the frequency of handovers of the UE 100-1 can be suppressed, for example.

Request Information

As the second example, the above-described information according to the state of the UE 100-1 includes information (hereinafter, "request information") on the request of the UE 100-1 related to radio communication. For example, the request information includes information of the number of CCs that the UE 100-1 uses for radio communication or information of the throughput in the radio communication of the UE 100-1. In other words, the above-described request information includes information of the number of CCs requested by the UE 100-1 or information of the throughput requested by the UE 100-1.

With the above, the network side is capable of, according to the request of the UE 100-1 related to the radio communication, determining the UE 100-1 that is to be connected to the macro eNB 200. Accordingly, for example, in a case in which the UE 100-1 requests to use a number of CCs, the UE 100-1 can be made to use the CC for the macro cell as the PCC. As a result, for example, regardless of activation of a number of SCCs, the possibility of a number of SCCs described above being deactivated in a short period of time (due to handovers of the PCCs) can be reduced. Furthermore, for example, in a case in which the UE 100-1 requests a high throughput, the UE 100-1 can be made to use the CC for the macro cell as the PCC. As a result, for example, regardless of a request for a high throughput, the possibility of the throughput decreasing due to frequent handovers can be reduced.

As described above, by providing the above-described information according to the state of the UE 100-1, for example, the UE 100-1 in which connection to the macro eNB 200 is effective can be connected to the macro eNB 200. Specifically, for example, the UE 100-1 in which using the CC for the macro cell as the PCC is effective can be made to use the CC for the macro cell as the PCC.

(Display Control Unit 165)

The display control unit 165 controls display of an output screen by the display unit 150. For example, the display control unit 165 generates an output screen to be displayed by the display unit 150 and causes the display unit 150 to display the output screen.

<3.3. Configuration of Pico eNB>

Figure 5:
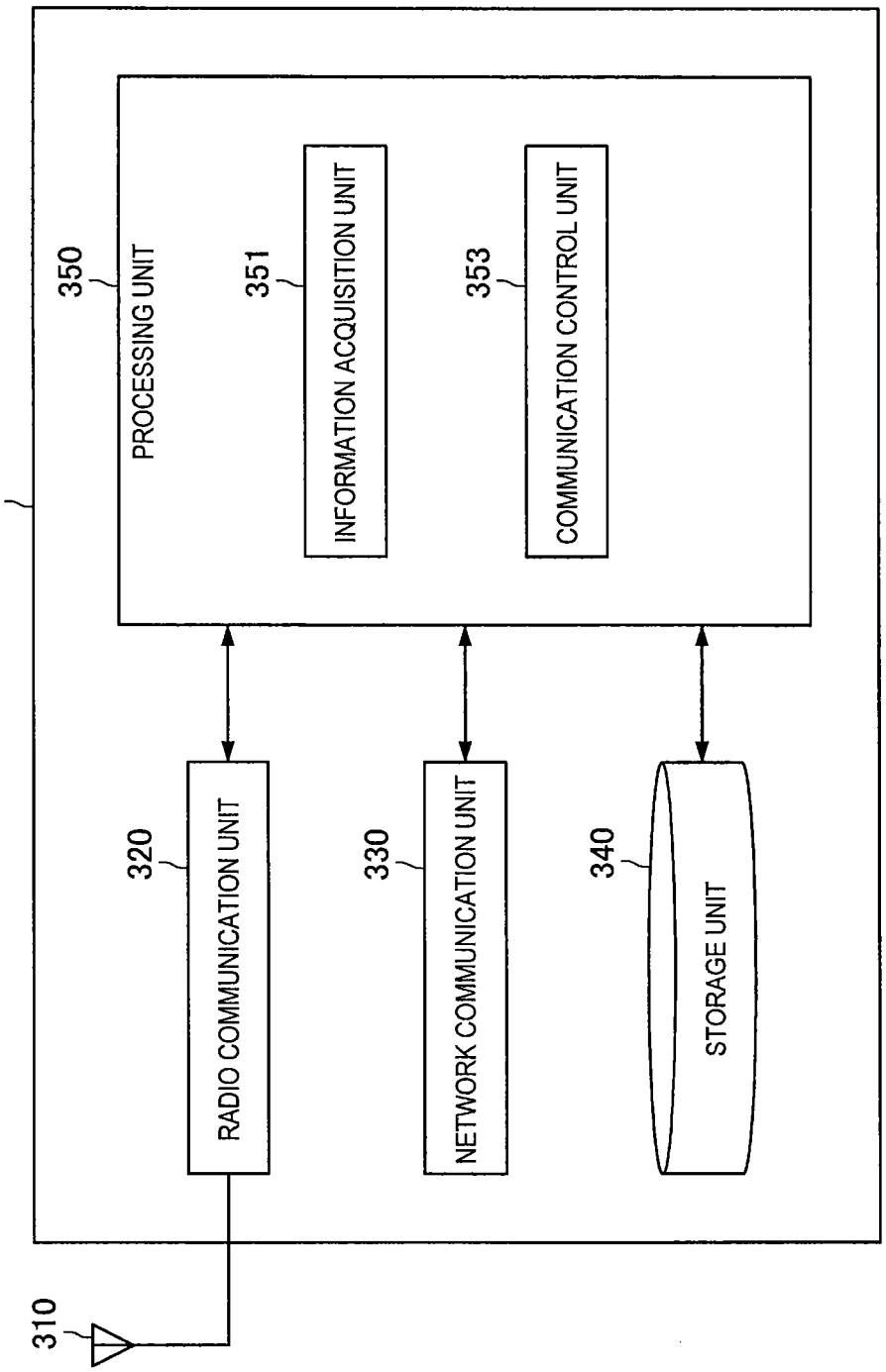
FIG. 5 is a block diagram illustrating an example of the configuration of a pico eNB according to the first embodiment.

Next, the example of the configuration of the pico eNB 300-1 according to the first embodiment will be described with reference to FIG. 5. FIG. 5 is a block diagram illustrating an example of the configuration of the pico eNB 300-1 according to the first embodiment. Referring to FIG. 5, the pico eNB 300-1 includes an antenna unit 310, a radio communication unit 320, a network communication unit 330, a storage unit 340, and a processing unit 350.

(Antenna Unit 310)

The antenna unit 310 receives a radio signal and outputs the received radio signal to the radio communication unit 320. The antenna unit 310 transmits a transmission signal output by the radio communication unit 320.

(Radio Communication Unit 320)

The radio communication unit 320 performs the radio communication with the UE 100 located in the pico cell 30. For example, the radio communication unit 320 uses a plurality of frequency bands (that is, the plurality of CCs for the pico cell) to perform the radio communication.

(Network Communication Unit 330)

The network communication unit 330 communicates with another communication node. The other communication node includes, for example, the micro eNB 200. The other communication node includes another pico eNB 300. The other communication node includes a communication node of a core network. For example, the core network is an EPC and the communication node includes a MME and a S-GW.

(Storage Unit 340)

The storage unit 340 stores a program and data for an operation of the pico eNB 300.

(Processing Unit 350)

The processing unit 350 provides various functions of the pico eNB 300-1. The processing unit 350 includes an information acquisition unit 351 and a communication control unit 353.

(Information Acquisition Unit 351)

The information acquisition unit 351 acquires information necessary for control by the communication control unit 353. For example, the information acquisition unit 351 acquires information from another device via the radio communication unit 320. For example, the information acquisition unit 351 acquires information stored in the storage unit 340.

For example, when the above-described information according to the state of the UE 100-1 is transmitted by the UE 100-1, the information acquisition unit 351 acquires the above-described information according to the state of the UE 100-1 through the radio communication unit 320.

(Communication Control Unit 353)

The communication control unit 353 performs control related to the radio communication in the pico cell 30.

Access Procedure

For example, the communication control unit 353 performs an access procedure for connection of the UE 100-1. More specifically, for example, when a random access preamble is received through the PRACH of the CC for the pico cell, the communication control unit 353 makes the radio communication unit 320 transmit a random access response. Furthermore, the communication control unit 353 performs RRC connection establishment in the CC for the pico cell.

Handover

For example, the communication control unit 353 controls the handover of the UE 100-1 on the basis of the above-described information according to the state of the UE 100-1. In other words, the communication control unit 353 controls the handover of the PCC of the UE 100 on the basis of the above-described information according to the state of the UE 100-1.

Movement State

As described above, for example, the above-described information according to the state of the UE 100-1 includes the above-described movement state information. Furthermore, for example, when the moving speed of the UE 100-1 exceeds a predetermined speed, the communication control unit 353 determines a handover of the PCC from the CC for the pico cell to the CC for the macro cell, and executes the handover.

Request

As described above, for example, the above-described information according to the state of the UE 100-1 includes the above-described request information.

As a first example, the above-described request information includes, for example, information on the number of CCs used by the UE 100-1 for radio communication (that is, the number of CCs requested by the UE 100-1). Furthermore, for example, when the requested number of CCs exceeds a predetermined number, the communication control unit 353 determines a handover of the PCC from the CC for the pico cell to the CC for the macro cell, and executes the handover.

As a second example, the above-described request information includes, for example, information of the throughput in the radio communication of the UE 100-1 (that is, the throughput requested by the UE 100-1). Furthermore, for example, when the requested throughput exceeds a predetermined value, the communication control unit 353 determines a handover of the PCC from the CC for the pico cell to the CC for the macro cell, and executes the handover.

<3.4. Flow of Process>

Figure 6:
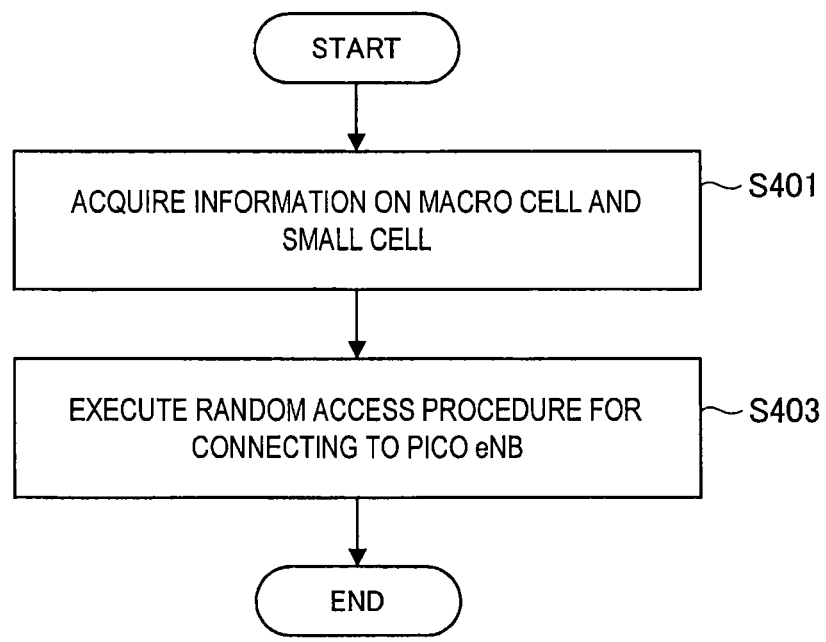
FIG. 6 is a flowchart illustrating an example of a schematic flow of a first communication control process (a process on the UE side related to a random access procedure) according to the first embodiment.
Figure 7:
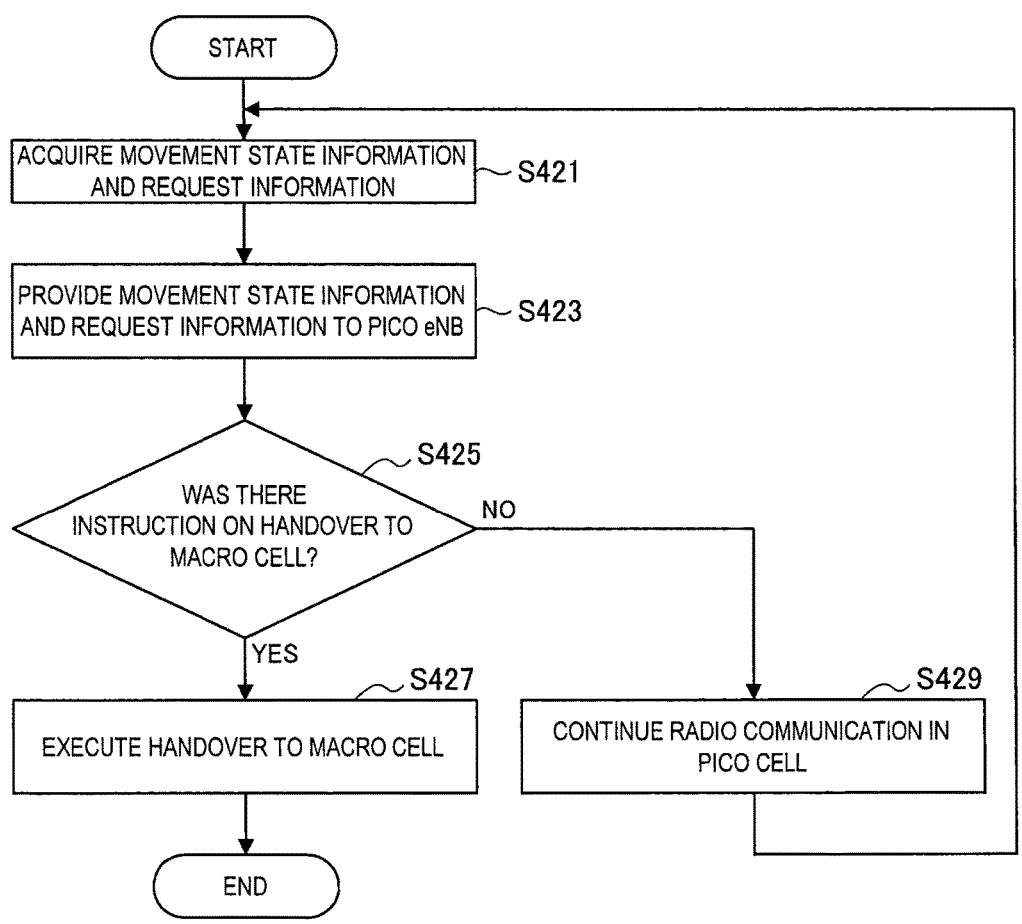
FIG. 7 is a flowchart illustrating an example of a schematic flow of a second communication control process (a process on the UE side related to a provision of information and a handover) according to the first embodiment.
Figure 8:
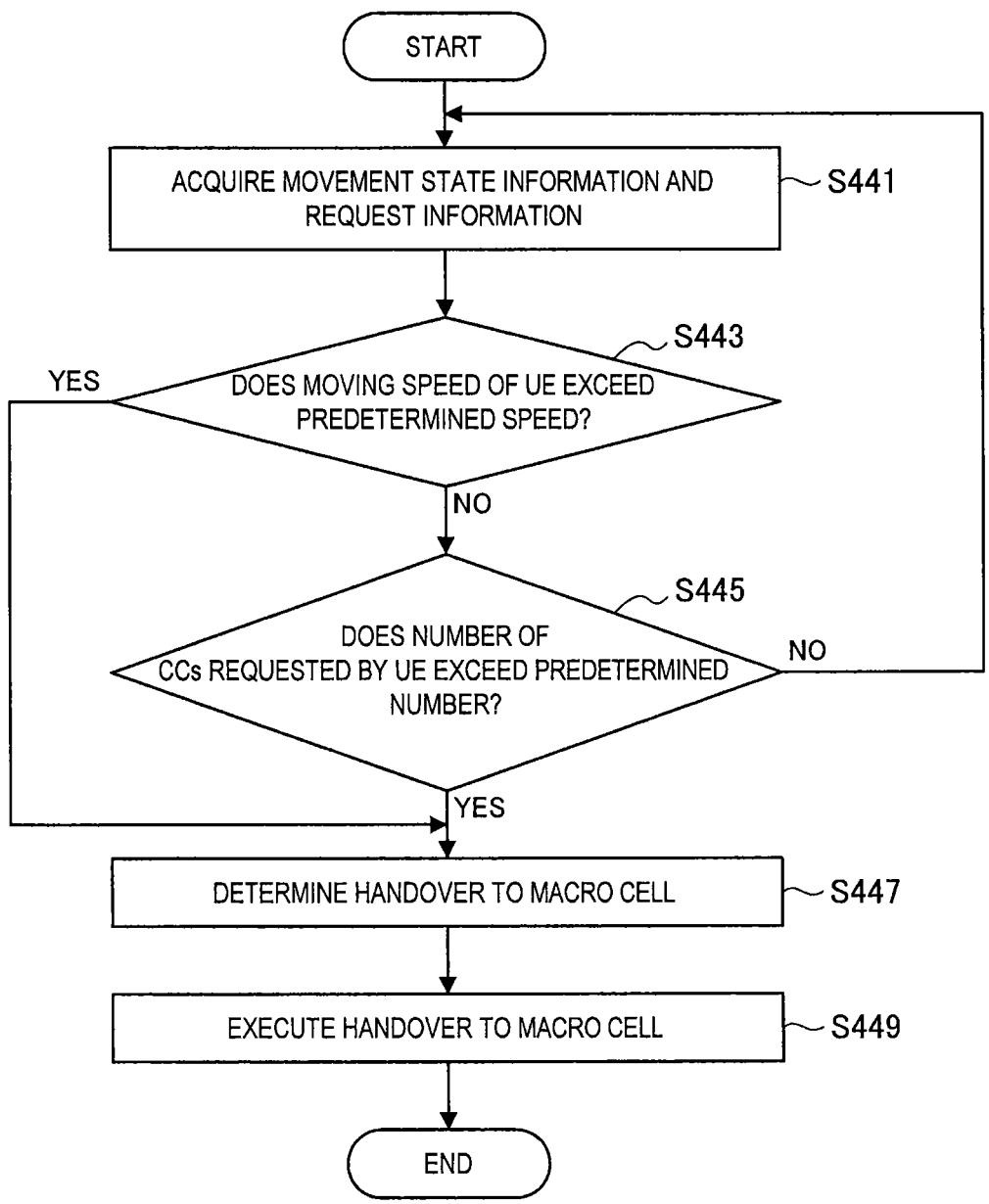
FIG. 8 is a flowchart illustrating an example of a schematic flow of a third communication control process (a process on the pico eNB side related to the handover) according to the first embodiment.

Referring next to FIGS. 6 to 8, an example of a communication control process according to the first embodiment will be described.

(First Communication Control Process: Process on UE Side Related to Random Access Procedure)

FIG. 6 is a flowchart illustrating an example of a schematic flow of a first communication control process (a process on the UE side related to a random access procedure) according to the first embodiment. The first communication control process is executed when the UE 100-1 is in the RRC idle state.

In step S401, the information acquisition unit 161 acquires information (that is, the cell information) on the macro cell 20 and the pico cell 30.

In step S403, the communication control unit 163 performs the random access procedure for connecting to the pico eNB 300-1. In other words, the communication control unit 163 performs the random access procedure in the CC for the pico cell. As a result, the UE 100-1 enters the RRC connected state. Then, the process is ended.

(Second Communication Control Process: Process on UE Side Related to Provision of Information and Handover)

FIG. 7 is a flowchart illustrating an example of a schematic flow of a second communication control process (a process on the UE side related to a provision of information and a handover) according to the first embodiment. The second communication control process is executed when the UE 100-1 is in the RRC connected state with the pico eNB 300-1 (that is, when the CC for the pico cell is the PCC).

In step S421, the information acquisition unit 161 acquires information on the movement state of the UE 100-1 (that is, the movement state information) and information on the request of the UE 100-1 related to radio communication (that is, the request information). In the example, the above-described movement state information includes the moving speed information of the UE 100-1. Furthermore, the above-described request information includes information on the number of CCs used by the UE 100-1 for radio communication (that is, the number of CCs requested by the UE 100-1).

In step S423, the communication control unit 163 provides the above-described movement state information and the above-described request information to the pico eNB 300-1.

In step S425, the communication control unit 163 determines whether there has been an instruction on a handover to the macro cell 20. If there has been an instruction on a handover to the macro cell 20, the process proceeds to step S427. If not, the process proceeds to step S429.

In step S427, the communication control unit 163 executes a handover to the macro cell 20. In other words, the communication control unit 163 executes a handover of the PCC to the CC for the macro cell. Then, the process is ended.

In step S429, the communication control unit 163 continues radio communication in the pico cell 30. Then, the process returns to step S421.

Note that at some timing, upon another trigger, when the UE 100-1 executes a handover to the macro cell 20 (the macro eNB 200), the above-described second communication control process may be ended.

(Third Communication Control Process: Process on Pico eNB Side Related to Handover)

FIG. 8 is a flowchart illustrating an example of a schematic flow of a third communication control process (a process on the pico eNB side related to a handover) according to the first embodiment. The third communication control process is executed on each UE 100-1 that is in the RRC connected state with the pico eNB 300-1.

In step S441, the information acquisition unit 351 acquires information on the movement state of the UE 100-1 (that is, the movement state information) and information on the request of the UE 100-1 related to radio communication (that is, the request information). In the example, the above-described movement state information includes the moving speed information of the UE 100-1. Furthermore, the above-described request information includes information on the number of CCs used by the UE 100-1 for radio communication (that is, the number of CCs requested by the UE 100-1).

In step S443, the communication control unit 353 determines whether the moving speed of the UE 100-1 exceeds a predetermined speed. If the moving speed exceeds the predetermined speed, the process proceeds to step S447. If not, the process proceeds to step S445.

In step S445, the communication control unit 353 determines whether the number of CCs requested by the UE 100-1 exceeds a predetermined number. If the number of requested CCs exceeds the predetermined number, the process proceeds to step S447. If not, the process returns to step S441.

In step S447, the communication control unit 353 determines a handover of the UE 100-1 to the macro cell 20.

In step S449, the communication control unit 353 executes the handover of the UE 100-1 to the macro cell 20. Then, the process is ended.

Furthermore, at some timing, when the UE 100-1 executes a handover to another pico cell 30 (another pico eNB 300-1), the above-described second communication control process may be ended.

Note that at some timing, upon another trigger, when the UE 100-1 executes a handover to the macro cell 20 (the macro eNB 200), the above-described second communication control process may be ended.

The first embodiment of the present disclosure has been described above. Note that the UE 100-1 according to the first embodiment may be a device (hereinafter, "MTC device") that performs machine type communication (MTC). With the above, in particular, increase in the load on the base station of the macro cell caused by the MTC device can be suppressed. Furthermore, in the above case, the UE 100-1 does not have to acquire and provide the above-described information according to the state of the UE 100-1.

4. Second Embodiment

Referring to FIGS. 9 to 13, a second embodiment of the present disclosure will be described next.

<4.1. Overview>
(Problem)

The problem related to the second embodiment is the same as the problem related to the first embodiment. In other words, the second embodiment is also capable of suppressing increase in the load on the base station of the macro cell, for example.

(Solution)

According to the second embodiment, when the UE 100 is not connected to any of the eNBs, in the access procedure with the eNB (in particular, the macro eNB 200), the UE 100 provides a message including the information according to the state of the UE 100 to the above-described eNB. Meanwhile, the macro eNB 200 determines whether to permit the connection of the UE 100 on the basis of the above-described information according to the state of the UE 100.

With the above, taking the state of the UE 100 into consideration, the network side can determine the UE 100 that is to be connected to the macro eNB 200. Accordingly, the access procedure (or the process of establishing a connection) of the UE 100 that is not connected to the macro eNB 200 can be aborted. Furthermore, with the abortion, the increase in signaling for establishing connections in the CCs of the macro cell 20 is suppressed and, as a result, the increase in load on the macro eNB 200 can be suppressed. As described above, the second embodiment is capable of suppressing increase in load on the macro eNB 200.

<4.2 Configuration of UE>

Figure 9:
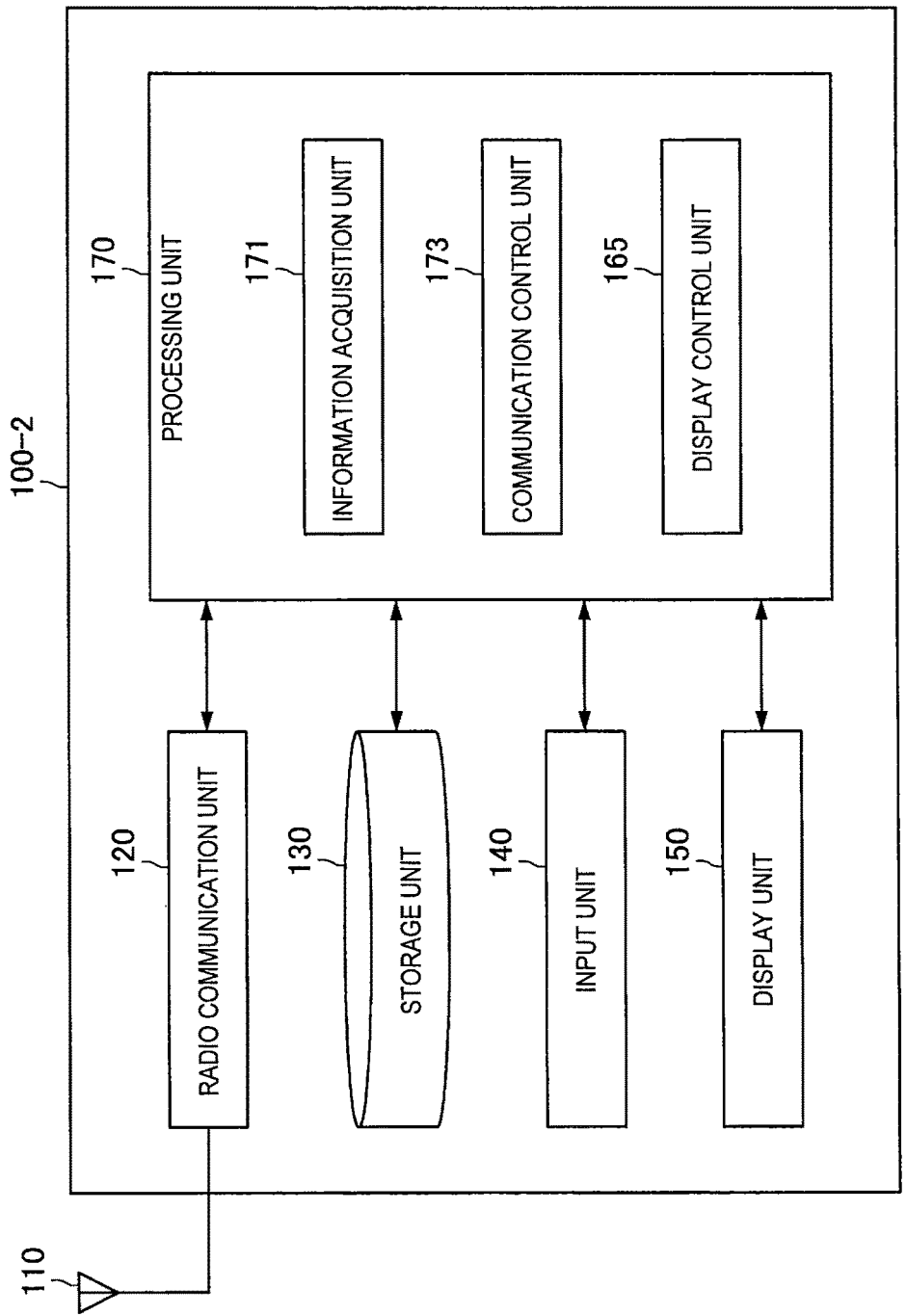
FIG. 9 is a block diagram illustrating an example of the configuration of a UE according to a second embodiment.

Next, an example of the configuration of the UE 100-2 according to the second embodiment will be described with reference to FIG. 9. FIG. 9 is a block diagram illustrating an example of the configuration of the UE 100-2 according to the second embodiment. Referring to FIG. 9, the UE 100-2 includes an antenna unit 110, a radio communication unit 120, a storage unit 130, an input unit 140, a display unit 150, and a processing unit 170.

Here, there is no difference in forms of the antenna unit 110, the radio communication unit 120, the storage unit 130, the input unit 140, the display unit 150, and the display control unit 165 included in a processing unit between the second embodiment and the above-described first embodiment. Thus, here, only an information acquisition unit 171 and a communication control unit 173 in a processing unit 170 will be described.

(Information Acquisition Unit 171)

The information acquisition unit 171 acquires information necessary for control by the communication control unit 173. For example, the information acquisition unit 171 acquires information from another device via the radio communication unit 120. For example, the information acquisition unit 171 acquires information stored in the storage unit 130.

In particular, in the second embodiment, the information acquisition unit 171 acquires the information according to the state of the UE 100-2. The information according to the state of the UE 100-2 is as described in the first embodiment.

(Communication Control Unit 173)

The communication control unit 173 performs control related to the radio communication by the UE 100-2.

Provision of Information in Access Procedure

In particular, in the second embodiment, when the UE 200-2 is not connected to any of the eNBs, in the access procedure for connection to the eNB, the communication control unit 173 provides a message including the above-described information according to the state of the UE 100-2 to the above-described eNB. The above-described access procedure is, for example, a random access procedure.

For example, the above-described information according to the state of the UE 100-2 that is included in the above-described message is information used in determining whether to permit connection to the eNB. More specifically, for example, the above-described information according to the state of the UE 100-2 is information used in determining whether to permit connection to the macro eNB 200-2.

Furthermore, for example, the above message is, in the above-described access procedure, a message in layer 2 or layer 3 of the communication protocol. More specifically, for example, the above-described message is a L2 message or a L3 message in the random access procedure. As an example, the above-described message is a RRC connection request message.

As a specific example, when the UE 100-2 is in the RRC idle state, in the random access procedure with the eNB, the communication control unit 173 provides the RRC connection request message including the above-described information according to the state of the UE 100-2 to the above-described eNB.

With the above, taking the state of the UE 100-2 into consideration, the network side can determine the UE 100-2 that is to be connected to the macro eNB 200. Accordingly, the access procedure (or the process of establishing a connection) of the UE 100-2 that is not connected to the macro eNB 200-2 can be aborted. Furthermore, with the abortion, the increase in signaling for establishing connections in the CCs of the macro cell 20 is suppressed and, as a result, the increase in load on the macro eNB 200-2 can be suppressed. As described above, the second embodiment is capable of suppressing increase in load on the macro eNB 200-2.

For example, the UE 100-2 in which connection to the macro eNB 200-2 is effective can be connected to the macro eNB 200-2. Specifically, for example, the UE 100-2 in which using the CC for the macro cell as the PCC is effective can be made to use the CC for the macro cell as the PCC.

Movement State Information

As a first example, the above-described information according to the state of the UE 100-2 includes information (i.e., movement state information) on the movement state of the UE 100-2. As an example, the movement state information is information on a moving speed of the UE 100-2.

With the above, the network side is capable of, according to the movement state of the UE 100-2, determining the UE 100-2 that is to be connected to the macro eNB 200-2. Accordingly, for example, in a case in which the moving speed of the UE 100-2 is high, the UE 100-2 can be made to use the CC for the macro cell as the PCC. As a result, the frequency of handovers of the UE 100-2 can be suppressed, for example.

Request Information

As the second example, the above-described information according to the state of the UE 100-2 includes information (i.e., request information) on the request of the UE 100-2 related to radio communication. For example, the request information includes information of the number of CCs that the UE 100-2 uses for radio communication or information of the throughput in the radio communication of the UE 100-2. In other words, the above-described request information includes information of the number of CCs requested by the UE 100-2 or information of the throughput requested by the UE 100-2.

With the above, the network side is capable of, according to the request of the UE 100-2 related to the radio communication, determining the UE 100-2 that is to be connected to the macro eNB 200-2. Accordingly, for example, in a case in which the UE 100-2 requests to use a number of CCs, the UE 100-2 can be made to use the CC for the macro cell as the PCC. As a result, for example, regardless of activation of a number of SCCs, the possibility of a number of SCCs described above being deactivated in a short period of time (due to handovers of the PCCs) can be reduced. Furthermore, for example, in a case in which the UE 100-2 requests a high throughput, the UE 100-2 can be made to use the CC for the macro cell as the PCC. As a result, for example, regardless of a request for a high throughput, the possibility of the throughput decreasing due to frequent handovers can be reduced.

On eNB that is Subject to Provision of Information

Note that the above-described eNB may be the macro eNB 200-2. In other words, the communication control unit 173 may transmit a message including the above-described information according to the state of the UE 100-2 to the macro eNB 200-2, and may transmit a message that does not include the above-described information according to the state of the UE 100-2 to the pico eNB 300. With the above, in the random access procedure for connection to the pico eNB 300, transmission of unnecessary information can be avoided. Note that in the above case, information indicating whether each CC is the CC for the macro cell or the CC for the pico cell may be notified to the UE 100-2 with the macro eNB 200-2 or the pico eNB 300.

<4.3. Configuration of Macro eNB>

Figure 10:
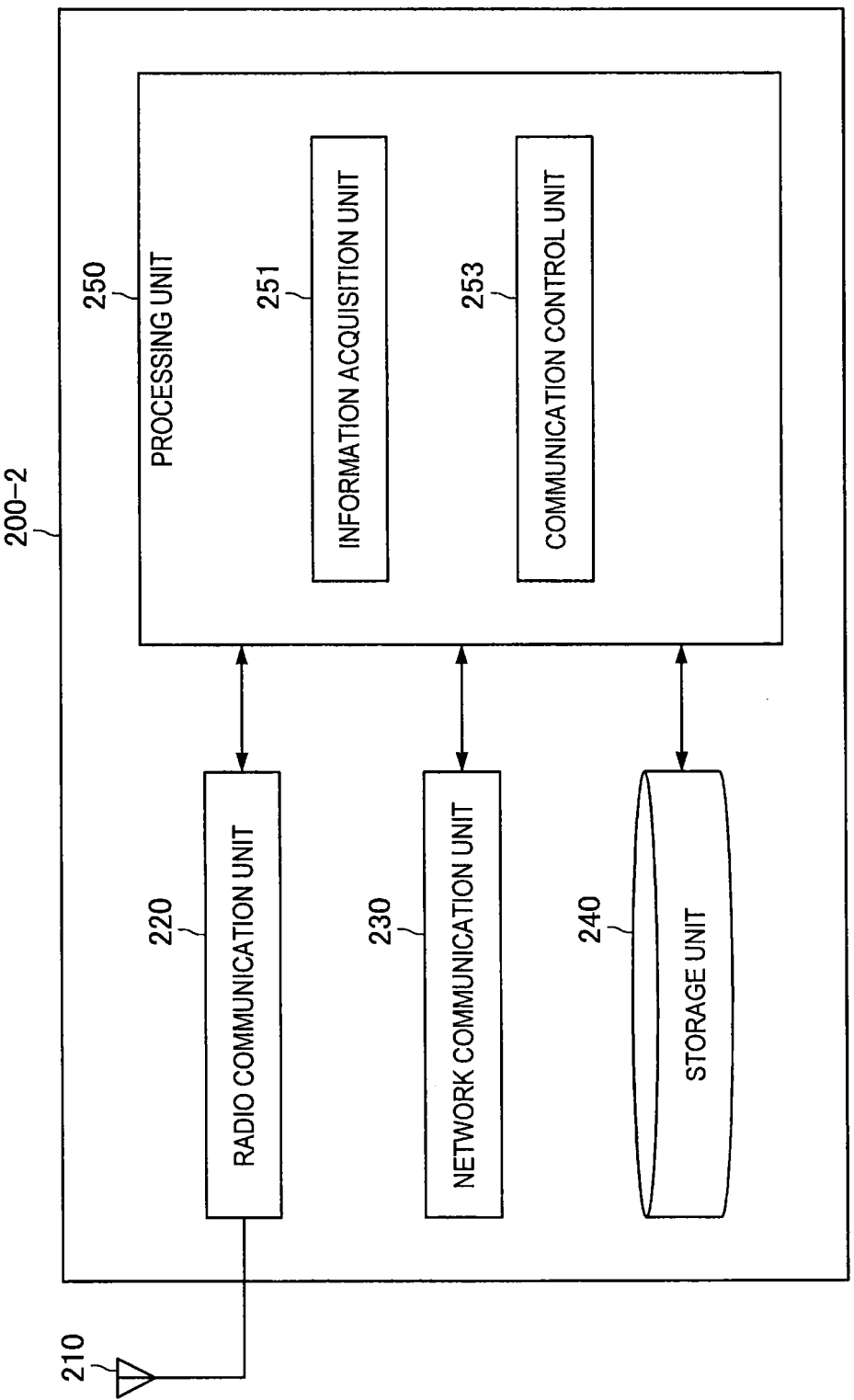
FIG. 10 is a block diagram illustrating an example of the configuration of a macro eNB according to the second embodiment.

Next, the example of the configuration of the macro eNB 200-2 according to the second embodiment will be described with reference to FIG. 10. FIG. 10 is a block diagram illustrating an example of the configuration of the macro eNB 300-2 according to the second embodiment. Referring to FIG. 10, the macro eNB 200-1 includes an antenna unit 210, a radio communication unit 220, a network communication unit 230, a storage unit 240, and a processing unit 250.

(Antenna Unit 210)

The antenna unit 210 receives a radio signal and outputs the received radio signal to the radio communication unit 220. The antenna unit 210 transmits the transmitted signal output by the radio communication unit 220.

(Radio Communication Unit 220)

The radio communication unit 220 performs the radio communication with the UE 100 located in the macro cell 20. For example, the radio communication unit 220 uses a plurality of frequency bands (that is, the plurality of CCs for the macro cell) to perform the radio communication.

(Network Communication Unit 230)

The network communication unit 230 communicates with another communication node. The other communication node includes, for example, the pico eNB 300. The other communication node includes another macro eNB 200. The other communication node includes a communication node of a core network. For example, the core network is an EPC and the communication node includes a MME and a S-GW.

(Storage Unit 240)

The storage unit 240 stores a program and data for an operation of the macro eNB 200.

(Processing Unit 250)

The processing unit 250 provides various functions of the macro eNB 200-2. The processing unit 250 includes an information acquisition unit 251 and a communication control unit 253.

(Information Acquisition Unit 251)

The information acquisition unit 251 acquires information necessary to control the communication control unit 253. For example, the information acquisition unit 251 acquires information from another device via the radio communication unit 220. For example, the information acquisition unit 251 acquires information stored in the storage unit 240.

In particular, in the second embodiment, in the access procedure for connection to the UE 100-2, when a message including the information according to the state of the UE 100-2 is provided by the UE 100-2, the information acquisition unit 251 acquires the information.

Specifically, for example, in the random access procedure, the UE 100-2 in the RRC idle state transmits the L2/L3 message (for example, the RRC connection request message) including the above-described information according to the state of the UE 100-2 to the macro eNB 200-2. Then, the information acquisition unit 251 acquires the above-described RRC connection request message through the radio communication unit 220, and acquires the above-described information according to the state of the UE 100-2 from the RRC connection request message.

As an example, a flag representing that the UE 100-2 is a UE after a specific release of the 3GPP is included in the above-described L2/L3 message. When the above-described flag is found in the above-described L2/L3 message, the information acquisition unit 251 acquires the above-described information (the movement state information, the request information, etc.) according to the state of the UE 100-2 included in the above-described L2/L3 message.

(Communication Control Unit 253)

The communication control unit 253 performs control related to the radio communication in the macro cell 20.

Access Procedure

For example, the communication control unit 253 performs an access procedure for connection of the UE 100-2. More specifically, for example, when a random access preamble is received through the PRACH of the CC for the macro cell, the communication control unit 253 makes the radio communication unit 220 transmit a random access response. Furthermore, the communication control unit 253 performs RRC connection establishment in the CC for the macro cell.

Determination of Connection Permission

In particular, in the second embodiment, the communication control unit 253 determines whether to permit connection of the UE 100-2 on the basis of the above-described information according to the state of the UE 100-2. In other words, the communication control unit 253 determines whether to permit the UE 100-2 to use the CC for the macro cell as the PCC on the basis of the above-described information according to the state of the UE 100-2.

Movement State

As a first example, the above-described information according to the state of the UE 100-2 includes the above-described movement state information. Furthermore, the communication control unit 253 determines whether to permit connection of the UE 100-2 on the basis of the above-described movement state information.

Specifically, for example, when the moving speed of the UE 100-2 exceeds a predetermined speed, the communication control unit 253 permits the UE 100-2 to connect to the macro eNB 200-2 (that is, the UE 100-2 to use the CC for the macro cell as the PCC).

Accordingly, with the determination of the permission with the movement state information, for example, in a case in which the moving speed of the UE 100-2 is high, the UE 100-2 can be made to use the CC for the macro cell as the PCC. As a result, the frequency of handovers of the UE 100-2 can be suppressed, for example.

Request

As a second example, the above-described information according to the state of the UE 100-2 includes the above-described request information. For example, the request information includes information of the number of CCs that the UE 100-2 uses for radio communication or information of the throughput in the radio communication of the UE 100-2. In other words, the above-described request information includes information of the number of CCs requested by the UE 100-2 or information of the throughput requested by the UE 100-1. Furthermore, the communication control unit 253 determines whether to permit connection of the UE 100-2 on the basis of the above-described request information.

Specifically, for example, when the requested number of CCs exceeds a predetermined number, the communication control unit 253 permits the UE 100-2 to connect to the macro eNB 200-2 (that is, the UE 100-2 to use the CC for the macro cell as the PCC).

Furthermore, for example, when the requested number of throughputs exceeds a predetermined value, the communication control unit 253 permits the UE 100-2 to connect to the macro eNB 200-2 (that is, the UE 100-2 to use the CC for the macro cell as the PCC).

Accordingly, with the determination of the permission with the request information, for example, in a case in which the UE 100-2 requests to use a number of CCs or in a case in which the UE 100-2 requests for a high throughput, the UE 100-2 can be made to use the CC for the macro cell as the PCC. As a result, for example, regardless of activation of a number of SCCs, the possibility of a number of SCCs described above being deactivated in a short period of time (due to handovers of the PCCs) can be reduced. Furthermore, for example, regardless of a request for a high throughput, the possibility of the throughput decreasing due to frequent handovers can be reduced.

As described above, with the determination of the permission of connection according to the state of the UE 100-2, for example, the UE 100-2 in which connection to the macro eNB 200-2 is effective can be connected to the macro eNB 200-2. Specifically, for example, the UE 100-2 in which using the CC for the macro cell as the PCC is effective can be made to use the CC for the macro cell as the PCC.

Furthermore, with the determination of the permission of connection according to the state of the UE 100-2, taking the state of the UE 100-2 into consideration, the network side can determine the UE 100-2 that is to be connected to the macro eNB 200-2. Accordingly, the access procedure (or the process of establishing a connection) of the UE 100-2 that is not connected to the macro eNB 200-2 can be aborted. Furthermore, with the abortion, the increase in signaling for establishing connections in the CCs of the macro cell 20 is suppressed and, as a result, the increase in load on the macro eNB 200-2 can be suppressed. As described above, the second embodiment is capable of suppressing increase in load on the macro eNB 200-2.

<4.4 Flow of Process>

Next, examples of the communication control process according to the second embodiment will be described with reference to FIGS. 11 to 13.

(Random Access Procedure)

Figure 11:
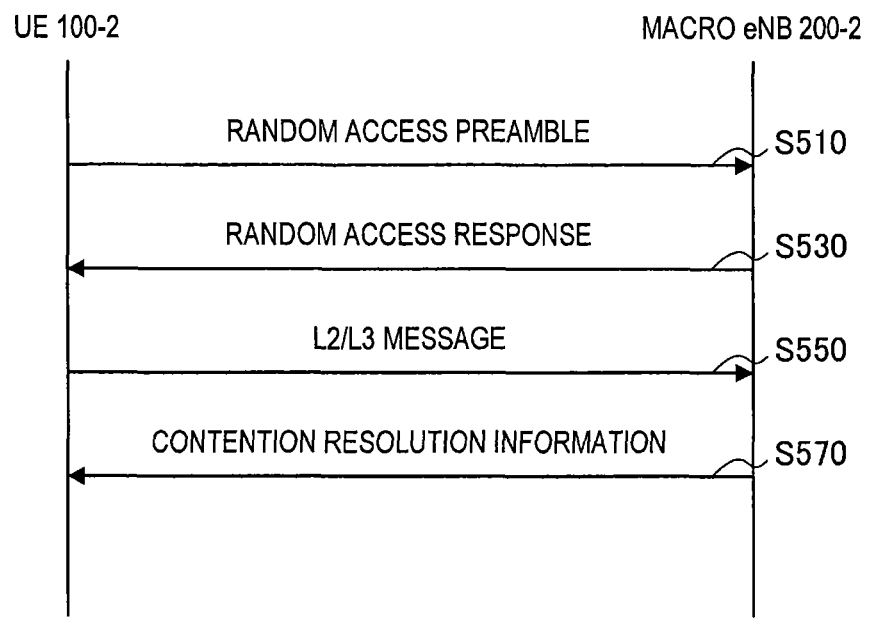
FIG. 11 is a sequence diagram illustrating an example of a schematic flow of a random access procedure according to the second embodiment.

FIG. 11 is a sequence diagram illustrating an example of a schematic flow of the random access procedure according to the second embodiment.

First, the UE 100-2 transmits the random access preamble through the PRACH of the CC for the macro cell (S510).

Then, the macro eNB 200-2 transmits a random access response to the UE 100-2 (S530).

Subsequently, the UE 100-2 transmits the L2/L3 message including the information according to the state of the UE 100-2 to the macro eNB 200-2 (S550). The L2/L3 message is, for example, the RRC connection request message.

Then, the macro eNB 200-2 transmits contention resolution information to the UE 100-2 (S570).

Note that in the second embodiment, the macro eNB 200-2 determines whether to permit connection of the UE 100-2 after step S550.

(First Communication Control Process: Process on UE Side Related to Provision of Message)

Figure 12:
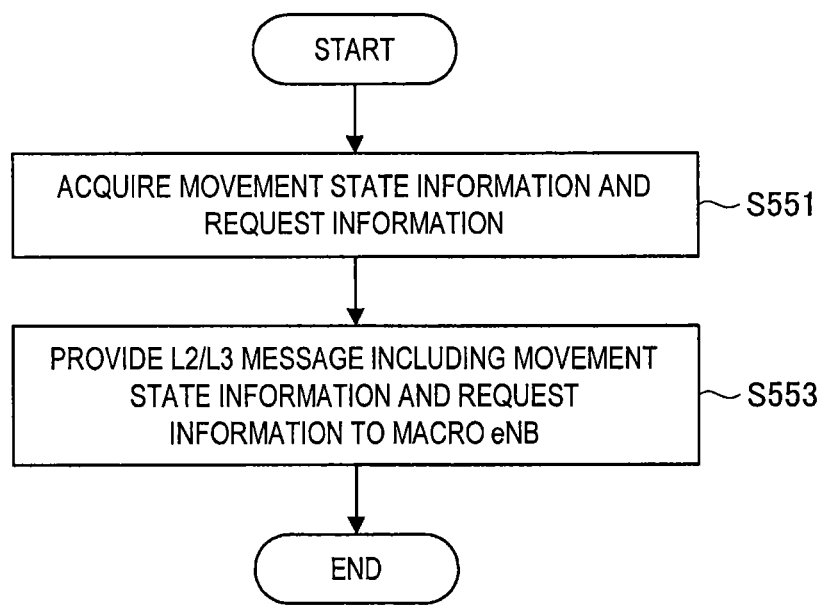
FIG. 12 is a flowchart illustrating an example of a schematic flow of a first communication control process (a process on the UE side related to a provision of a message) according to the second embodiment.

FIG. 12 is a flowchart illustrating an example of a schematic flow of a first communication control process (a process on the UE side related to a provision of a message) according to the second embodiment. The first communication process corresponds to step S550 among the process of the random access procedure described while referring to FIG. 11.

In step S551, the information acquisition unit 171 acquires information on the movement state of the UE 100-2 (that is, the movement state information) and information on the request of the UE 100-2 related to radio communication (that is, the request information). In the example, the above-described movement state information includes the moving speed information of the UE 100-2. Furthermore, the above-described request information includes information on the number of CCs used by the UE 100-2 for radio communication (that is, the number of CCs requested by the UE 100-2).

In step S553, the communication control unit 173 provides the L2/L3 message including the above-described movement state information and the above-described request information to the macro eNB 200-2. For example, the L2/L3 message is the RRC connection request message. Then, the process is ended.

(Second Communication Control Process: Process on Macro eNB Side Related to Permission of Connection of UE)

Figure 13:
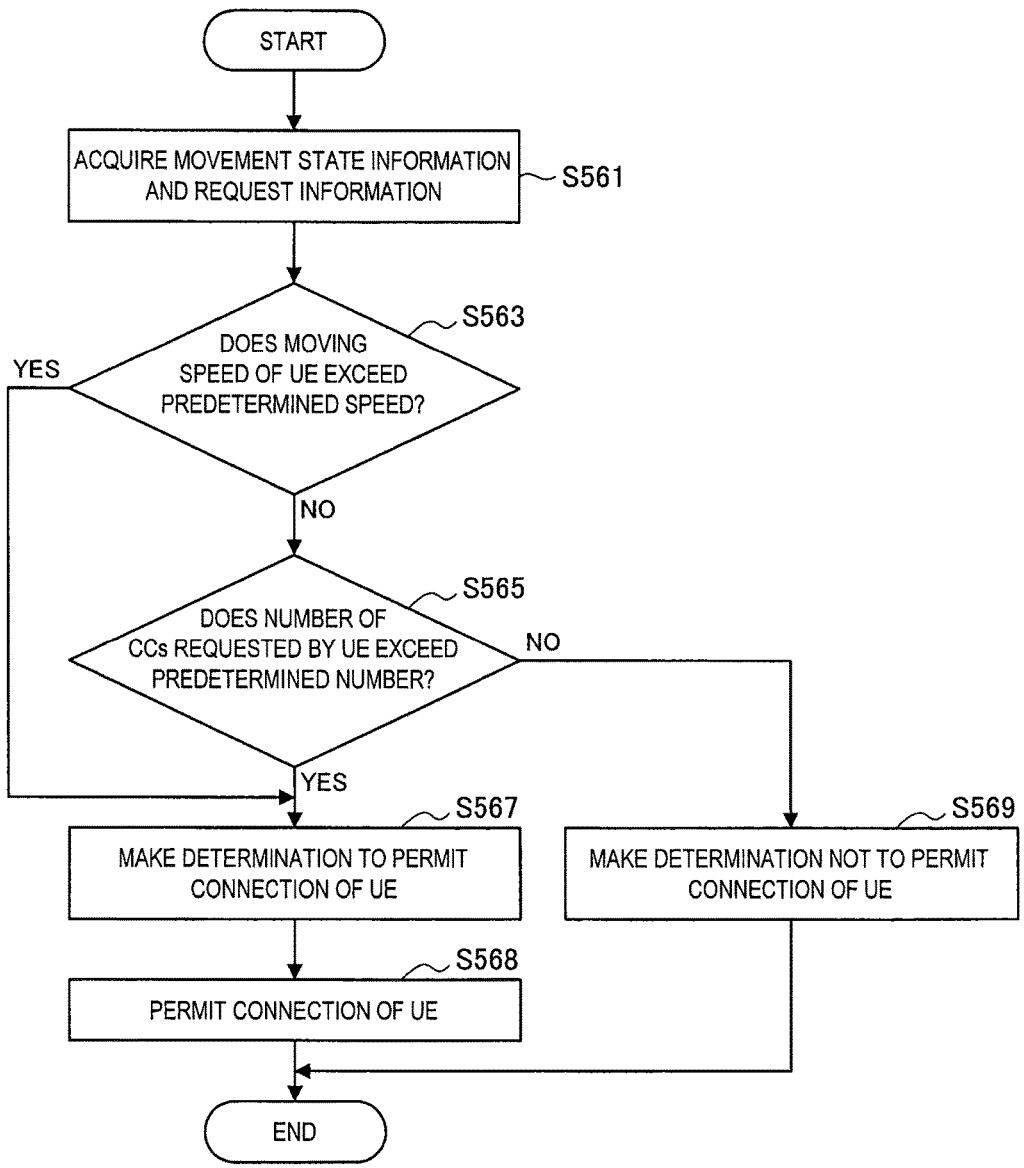
FIG. 13 is a flowchart illustrating an example of a schematic flow of a second communication control process (a process on the macro eNB side related to permission of connection of the UE) according to the second embodiment.

FIG. 13 is a flowchart illustrating an example of a schematic flow of a second communication control process (a process on the macro eNB side related to permission of connection of the UE) according to the second embodiment. The second communication control process is executed after step S550 among the process of the random access procedure described while referring to FIG. 11.

In step S561, the information acquisition unit 251 acquires information on the movement state of the UE 100-2 (that is, the movement state information) and information on the request of the UE 100-2 related to radio communication (that is, the request information). In the example, the above-described movement state information includes the moving speed information of the UE 100-2. Furthermore, the above-described request information includes information on the number of CCs used by the UE 100-2 for radio communication (that is, the number of CCs requested by the UE 100-2).

In step S563, the communication control unit 253 determines whether the moving speed of the UE 100-2 exceeds a predetermined speed. If the moving speed exceeds the predetermined speed, the process proceeds to step S567. If not, the process proceeds to step S565.

In step S565, the communication control unit 253 determines whether the number of CCs requested by the UE 100-2 exceeds a predetermined number. If the number of requested CCs exceeds the predetermined number, the process proceeds to step S567. If not, the process proceeds to step S569.

In step S567, the communication control unit 253 makes a determination permitting the UE 100-2 to connect to the macro eNB 200-2 (that is, the UE 100-2 to use the CC for the macro cell as the PCC).

In step S568, the communication control unit 253 permits the UE 100-2 to connect to the macro eNB 200-2 (that is, the UE 100-2 to use the CC for the macro cell as the PCC). Then, the process is ended.

In step S569, the communication control unit 253 makes a determination of not permitting the UE 100-2 to connect to the macro eNB 200-2 (that is, the UE 100-2 to use the CC for the macro cell as the PCC). Then, the process is ended.

5. Third Embodiment

Referring to FIGS. 14 to 18, a third embodiment of the present disclosure will be described next.

<5.1. Overview>

(Problem)

In LTE and LTE-Advanced, when a piece of UE is in a RRC idle state (for example, after the UE has been powered up), in order to perform transition from the RRC idle state to an RRC connected state, the UE performs a random access procedure, for example. Then, the UE determines in which CC the random access procedure is to be performed. In other words, to which eNB the UE is to be connected is determined by the UE.

However, in a case in which a macro cell and a pico cell are present, if a number of UEs perform random access procedures in the CC of the macro cell, the signaling for establishing connection may increase in the CC of the macro cell. As a result, from the viewpoint of radio resource and processing, a concern that there will be a large load on the macro eNB is met.

Furthermore, it is considered that devices (that is, MTC devices) that perform machine type communication (MTC) will increase herefrom. Accordingly, in particular, a large load may be imposed on the macro eNB owing to the random access procedures of the MTC devices.

Note that the random access procedure with the UE may be forbidden or reduced in the CCs of the macro cell by access barring. However, access barring cannot forbid an access of a specific UE. For example, with access barring, it is not possible allow a UE that is not an MTC device to be connected to the macro eNB while not allowing a UE that is an MTC device to be connected to the macro eNB.

Accordingly, it is desirable that a system that enables suppression of increase, owing to the MTC device, in the load on the base station of the macro cell be provided, for example.

(Solution)

According to the third embodiment, in the access procedure for connecting to the eNB (in particular, the macro eNB 200), the UE 100 provides a message including device information that indicates that the UE 100 is a device (an MTC device) that performs machine type communication with the above-described eNB. Meanwhile, in the access procedure for connecting to the UE 100, when the above-described device information is provided, the macro eNB 200 determines that the above-described connection of the UE 100 is not to be permitted.

Accordingly, the access procedure (or the process of establishing a connection) of the UE 100 that is the MTC device can be aborted. Furthermore, with the abortion, the increase in signaling for establishing connections in the CCs of the macro cell 20 is suppressed and, as a result, the increase in load on the macro eNB 200 can be suppressed. As described above, the third embodiment is capable of suppressing increase in load, owing to the MTC device, on the macro eNB 200.

<5.2. Configuration of UE>

Figure 14:
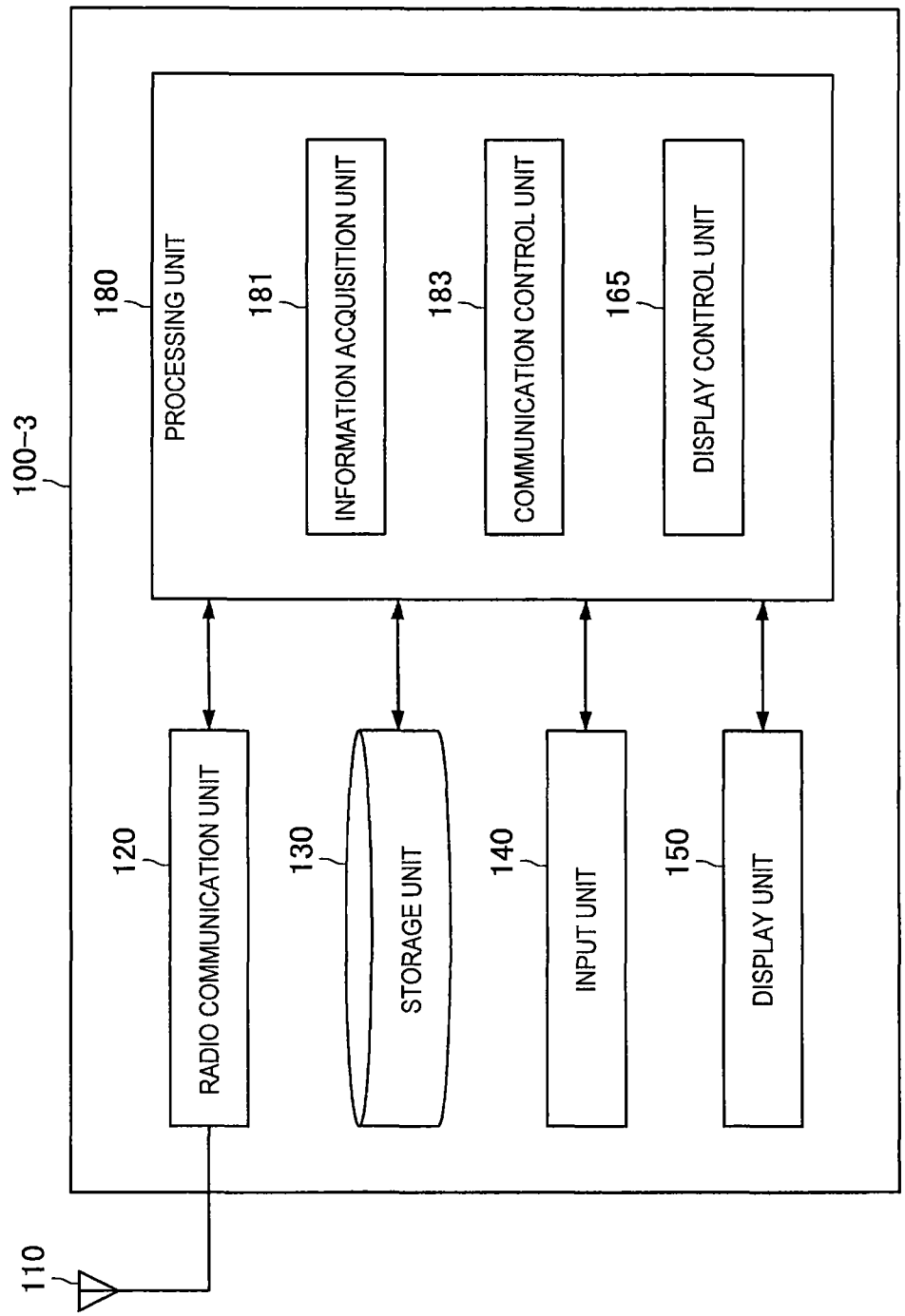
FIG. 14 is a block diagram illustrating an example of the configuration of a UE according to a third embodiment.

Next, the configuration of the UE 100-3 according to the third embodiment will be described with reference to FIG. 14. FIG. 14 is a block diagram illustrating an example of the configuration of the UE 100-3 according to the third embodiment. Referring to FIG. 14, the UE 100-3 includes an antenna unit 110, a radio communication unit 120, a storage unit 130, an input unit 140, a display unit 150, and a processing unit 180. In particular, in the third embodiment, the UE 100-3 is a device (an MTC device) that performs MTC communication.

Here, there is no difference in forms of the antenna unit 110, the radio communication unit 120, the storage unit 130, the input unit 140, the display unit 150, and the display control unit 165 included in a processing unit between the third embodiment and the above-described first embodiment. Thus, here, only an information acquisition unit 181 and a communication control unit 183 in a processing unit 180 will be described.

(Information Acquisition Unit 181)

The information acquisition unit 181 acquires information necessary for control by the communication control unit 183. For example, the information acquisition unit 181 acquires information from another device via the radio communication unit 120. For example, the information acquisition unit 181 acquires information stored in the storage unit 130.

In particular, in the third embodiment, the information acquisition unit 181 acquires device information indicating that the UE 100-3 is an MTC device.

(Communication Control Unit 183)

The communication control unit 183 controls radio communication by the UE 100-3.

Provision of Information in Access Procedure

In particular, in the third embodiment, in the access procedure for connection to the eNB, the communication control unit 183 provides a message including the above-described device information indicating that the UE 200-3 is an MTC device to the above-described eNB. For example, when the above-described eNB to which the above-described message including the above-described device information is provided is the macro eNB 200-3, the connection with the above eNB is not permitted. The above-described access procedure is, for example, a random access procedure.

Furthermore, for example, the above message is, in the above-described access procedure, a message in layer 2 or layer 3 of the communication protocol. More specifically, for example, the above-described message is a L2 message or a L3 message in the random access procedure. As an example, the above-described message is a RRC connection request message.

As a specific example, in the random access procedure with the eNB, the communication control unit 183 provides the RRC connection request message including the above-described device information to the above-described eNB.

Accordingly, the access procedure (or the process of establishing a connection) of the UE 100-3 that is the MTC device can be aborted. Furthermore, with the abortion, the increase in signaling for establishing connections in the CCs of the macro cell 20 is suppressed and, as a result, the increase in load on the macro eNB 200-3 can be suppressed. As described above, the third embodiment is capable of suppressing increase in load on the macro eNB 200-3 due to the MTC device.

On eNB that is Subject to Provision of Information

Note that the eNB to which the above-described message including the above-described device information is provided may be the macro eNB 200-3. In other words, the communication control unit 183 may transmit the message including the above-described device information to the macro eNB 200-3, and may transmit a message that does not include the above-described device information to the pico eNB 300. With the above, in the random access procedure for connection to the pico eNB 300, transmission of unnecessary information can be avoided. Note that in the above case, information indicating whether each CC is the CC for the macro cell or the CC for the pico cell may be notified to the UE 100-3 with the macro eNB 200-3 or the pico eNB 300.

<5.3. Configuration of Macro eNB>

Figure 15:
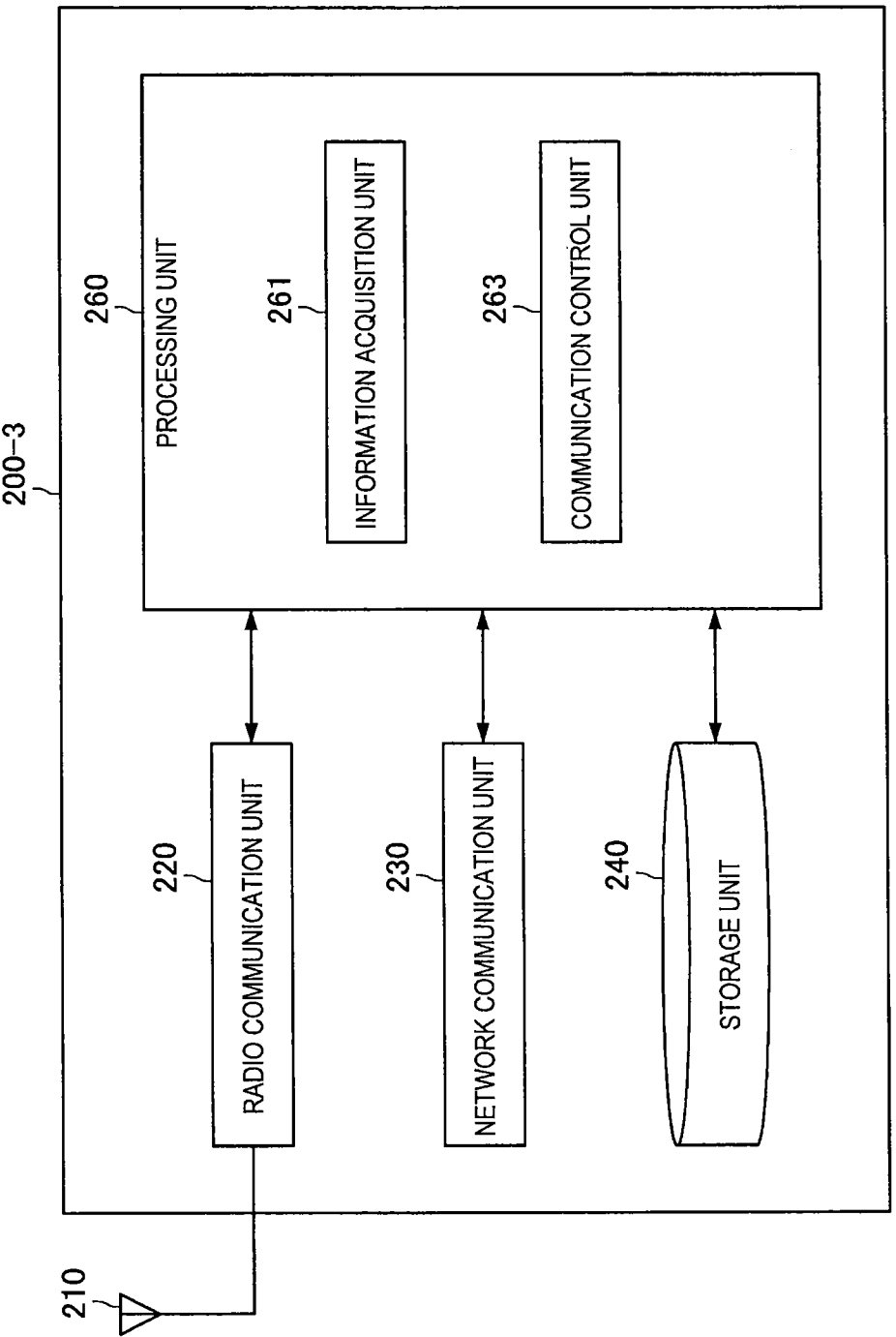
FIG. 15 is a block diagram illustrating an example of the configuration of a macro eNB according to the third embodiment.

Next, the example of the configuration of the macro eNB 200-3 according to the third embodiment will be described with reference to FIG. 15. FIG. 15 is a block diagram illustrating an example of the configuration of the macro eNB 300-3 according to the third embodiment. Referring to FIG. 15, the macro eNB 200-3 includes an antenna unit 210, a radio communication unit 220, a network communication unit 230, a storage unit 240, and a processing unit 260.

Here, there is no difference in forms of the antenna unit 210, the radio communication unit 220, the network communication unit 230, and the storage unit 240 between the fourth embodiment and the above-described first embodiment. Thus, here, only the processing unit 260 will be described.

(Processing Unit 260)

The processing unit 260 supplies various functions of the macro eNode 200-3. The processing unit 260 includes an information acquisition unit 261 and a communication control unit 263.

(Information Acquisition Unit 261)

The information acquisition unit 261 acquires information necessary for control by the communication control unit 263. For example, the information acquisition unit 261 acquires information from another device via the radio communication unit 220. For example, the information acquisition unit 261 acquires information stored in the storage unit 240.

In particular, in the third embodiment, in the access procedure for connection to the UE 100-3, when the message including the above-described device information indicating that the UE 100-3 is an MTC device is provide by the UE 100-3, the information acquisition unit 261 acquires the device information.

Specifically, for example, in the random access procedure, the UE 100-3 in the RRC idle state transmits the L2/L3 message (for example, the RRC connection request message) including the above-described device information to the macro eNB 200-3. Then the information acquisition unit 261 acquires the above-described RRC connection request message through the radio communication unit 220, and acquires the above-described device information from the RRC connection request message.

(Communication Control Unit 263)

The communication control unit 263 performs control related to the radio communication in the macro cell 20.

Access Procedure

For example, the communication control unit 263 performs an access procedure for connection of the UE. More specifically, for example, when a random access preamble is received through the PRACH of the CC for the macro cell, the communication control unit 263 makes the radio communication unit 220 transmit a random access response. Furthermore, the communication control unit 263 performs RRC connection establishment in the CC for the macro cell.

Determination of Connection Permission

In particular, in the second embodiment, in the access procedure for connection to the UE 100-3, when a message including the above-described device information is provided (that is, when the above-described device information is acquired) by the UE 100-3, the communication control unit 263 determines that the above connection of the UE 100-3 is not to be permitted.

Accordingly, the access procedure (or the process of establishing a connection) of the UE 100-3 that is the MTC device can be aborted. Furthermore, with the abortion, the increase in signaling for establishing connections in the CCs of the macro cell 20 is suppressed and, as a result, the increase in load on the macro eNB 200-3 can be suppressed. As described above, the third embodiment is capable of suppressing increase in load, owing to the MTC device, on the macro eNB 200-3.

<5.4 Flow of Process>

Figure 16:
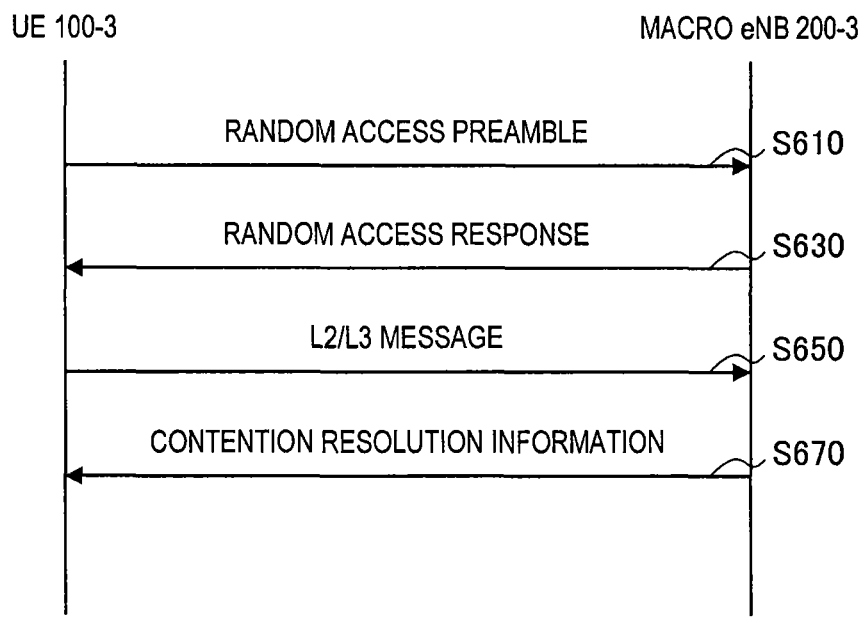
FIG. 16 is a sequence diagram illustrating an example of a schematic flow of a random access procedure according to the third embodiment.

Next, examples of the communication control process according to the third embodiment will be described with reference to FIGS. 16 to 18.

(Random Access Procedure)

FIG. 161 is a sequence diagram illustrating an example of a schematic flow of the random access procedure according to the third embodiment.

First, the UE 100-3 transmits the random access preamble through the PRACH of the CC for the macro cell (S610).

Then, the macro eNB 200-3 transmits a random access response to the UE 100-3 (S630).

Subsequently, the UE 100-3 transmits the L2/L3 message including the device information indicating that the UE 100-3 is an MTC device to the macro eNB 200-3 (S650). The L2/L3 message is, for example, the RRC connection request message.

Then, the macro eNB 200-3 transmits contention resolution information to the UE 100-3 (S670).

Note that in the third embodiment, the macro eNB 200-3 determines whether to permit connection of the UE 100-3 after step S650.

(First Communication Control Process: Process on UE Side Related to Provision of Message)

Figure 17:
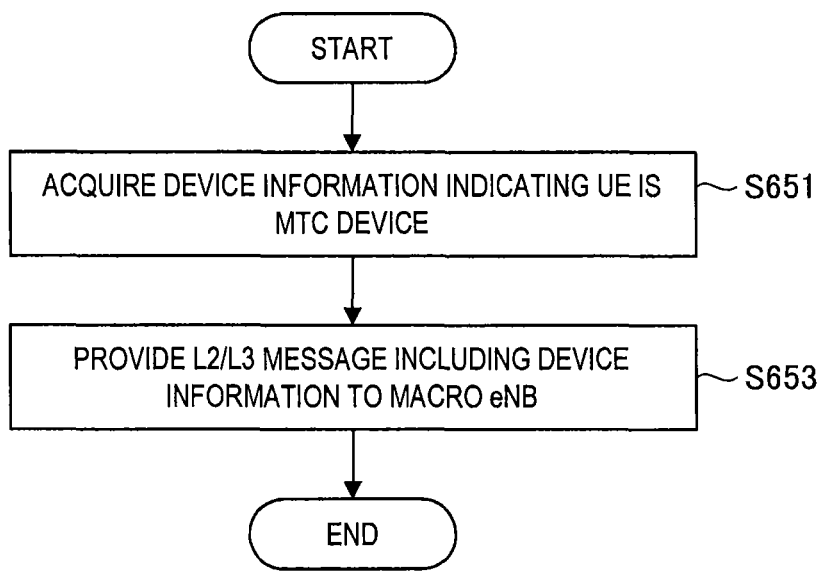
FIG. 17 is a flowchart illustrating an example of a schematic flow of a first communication control process (a process on the UE side related to a provision of a message) according to the third embodiment.

FIG. 17 is a flowchart illustrating an example of a schematic flow of a first communication control process (a process on the UE side related to a provision of a message) according to the third embodiment. The first communication process corresponds to step S650 among the process of the random access procedure described while referring to FIG. 16.

In step S651, the information acquisition unit 181 acquires the device information indicating that the UE 100-3 is an MTC device.

In step S653, the communication control unit 183 provides the L2/L3 message including the above-described movement state information and the above-described request information to the macro eNB 200-3. For example, the L2/L3 message is the RRC connection request message. Then, the process is ended.

(Second Communication Control Process: Process on Macro eNB Side Related to Permission of Connection of UE)

Figure 18:
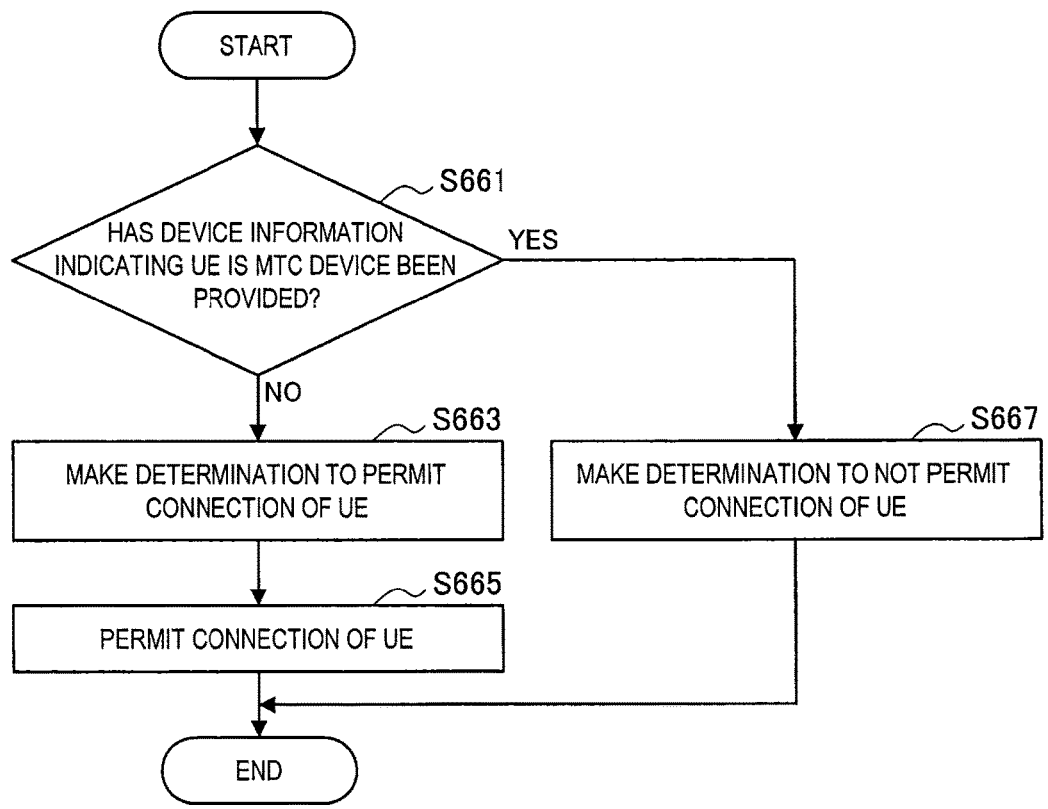
FIG. 18 is a flowchart illustrating an example of a schematic flow of a second communication control process (a process on the macro eNB side related to permission of connection of the UE) according to the third embodiment.

FIG. 18 is a flowchart illustrating an example of a schematic flow of a second communication control process (a process on the macro eNB side related to permission of connection of the UE) according to the third embodiment. The third communication control process is executed after step S650 among the process of the random access procedure described while referring to FIG. 16.

In step S661, the communication control unit 263 determines whether the device information indicating that the UE 100-3 is an MTC device has been provided. When the device information has been provided, the process proceeds to step S663. If not, the process proceeds to step S665.

In step S667, the communication control unit 263 makes a determination permitting the UE 100-3 to connect to the macro eNB 200-3 (that is, the UE 100-3 to use the CC for the macro cell as the PCC).

In step S665, the communication control unit 263 permits the UE 100-3 to connect to the macro eNB 200-3 (that is, the UE 100-3 to use the CC for the macro cell as the PCC). Then, the process is ended.

In step S667, the communication control unit 263 makes a determination of not permitting the UE 100-3 to connect to the macro eNB 200-3 (that is, the UE 100-3 to use the CC for the macro cell as the PCC). Then, the process is ended.

6. Fourth Embodiment

Referring to FIGS. 19 to 22, a fourth embodiment of the present disclosure will be described next.

<6.1. Overview>

(Problem)

In the scenario of small cells, traffic may concentrate in a specific cell (or an eNB) or a specific frequency band (for example, a CC) and congestion may be created. For example, traffic may concentrate in the CC for the macro cell (or the macro eNB). Furthermore, for example, traffic may concentrate in the CC for the pico cell (or a specific pico eNB).

In order to restrain such concentration of traffic, one may conceive of adjusting the traffic through connection admission control (CAC) after the random access procedure has been completed. However, such a method may impose a large load on the core network.

Note that in order to restrain concentration of the above-described traffic, the random access procedure with the UE may be forbidden or reduced in the CCs of the macro cell by access barring. However, since access barring cannot forbid an access of a specific UE, it is difficult for the operator of the communication system to flexibly restrain concentration of traffic.

Accordingly, in the fourth embodiment, for example, restraint of congestion can be flexibly performed without imposing a load on the core network.

(Solution)

According to the fourth embodiment, on the basis of congestion information on the congestion of each of the plurality of CCs, the eNB (macro eNB 200 and/or the pico eNB 300) controls the priorities of measurements of the above-described plurality of CCs performed by the UE 100. Meanwhile, the UE 100 controls the execution of the measurements of the above-described plurality of CCs according to the above-described priorities.

With the above, for example, the UE 100 is capable of preferentially performing a measurement of a CC having a lighter congestion (or a CC having no congestion) over a measurement of a CC having a heavier congestion. As a result, there will be a higher possibility of the UE 100 performing the random access procedure in the CC with a lighter congestion (or the CC with no congestion) and using the relevant CC. Accordingly, congestion can be restricted without imposing a load on the core network. Furthermore, the priority of measurement can be changed in each UE 100 and, accordingly, congestion can be restrained in a further flexible manner.

Note that herein, as an example of the fourth embodiment, an example in which the macro eNB 200 controls the above-described priorities will be described. However, note that in the fourth embodiment, in place of the macro eNB 200, or together with the macro eNB 200, the pico eNB 300 may control the above-described priorities in a similar manner.

<6.2. Configuration of Macro eNB>

Figure 19:
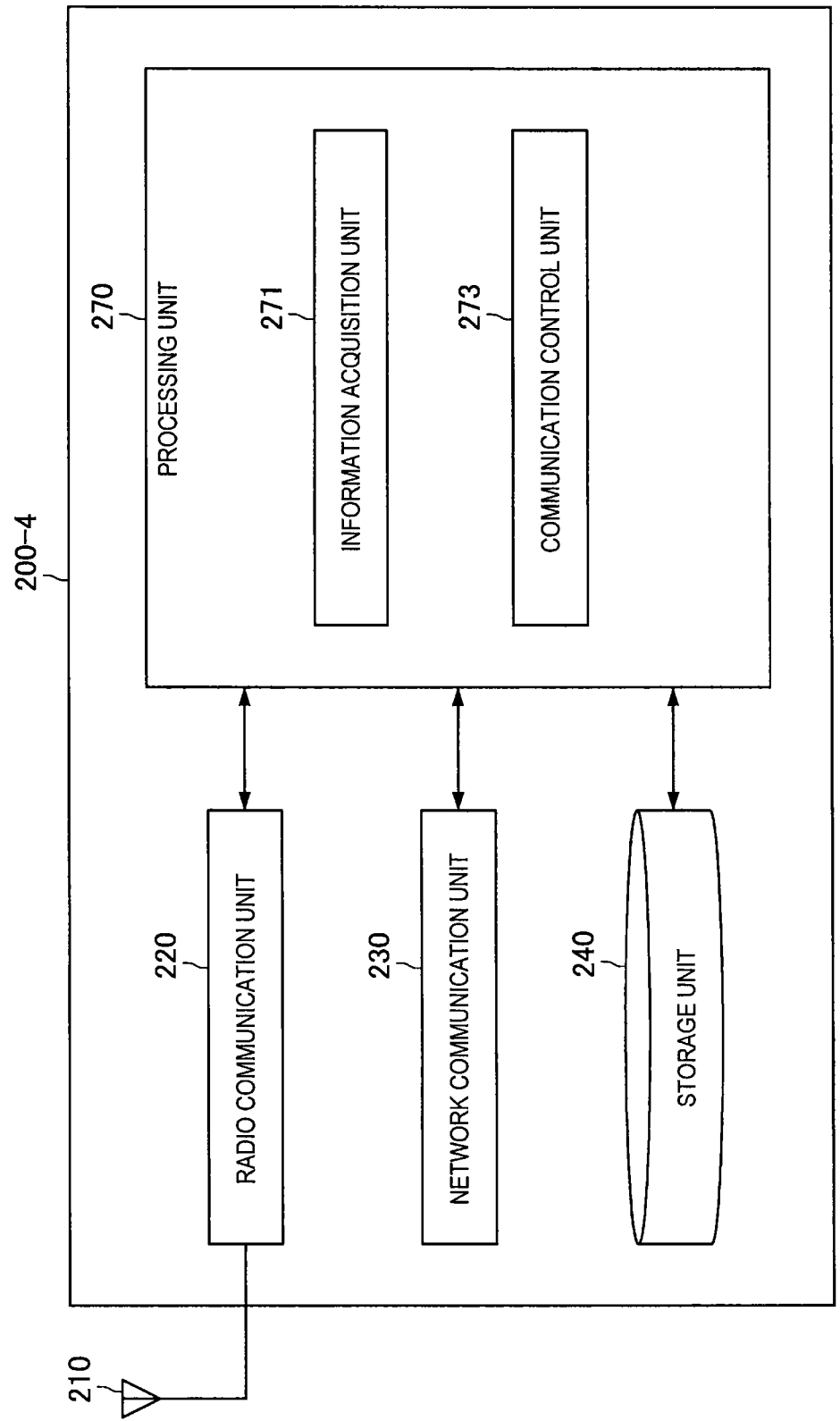
FIG. 19 is a block diagram illustrating an example of the configuration of a UE according to a fourth embodiment.

Next, the example of the configuration of the macro eNB 200-4 according to the fourth embodiment will be described with reference to FIG. 19. FIG. 19 is a block diagram illustrating an example of the configuration of the macro eNB 200-4 according to the third embodiment. Referring to FIG. 19, the macro eNB 200-4 includes an antenna unit 210, a radio communication unit 220, a network communication unit 230, a storage unit 240, and a processing unit 270.

Here, there is no difference in forms of the antenna unit 210, the radio communication unit 220, the network communication unit 230, and the storage unit 240 between the fourth embodiment and the above-described second embodiment. Thus, here, only the processing unit 270 will be described.

(Processing Unit 270) The processing unit 270 supplies various functions of the macro eNode 200-4. The processing unit 270 includes an information acquisition unit 271 and a communication control unit 273.

(Information Acquisition Unit 271)

The information acquisition unit 271 acquires information necessary for control by the communication control unit 273. For example, the information acquisition unit 271 acquires information from another device via the radio communication unit 220. For example, the information acquisition unit 271 acquires information stored in the storage unit 240.

In particular, in the fourth embodiment, the information acquisition unit 271 acquires congestion information on the congestion state of each of the plurality of frequency bands (CCs). For example, the congestion information is information indicating the degree of congestion of each of the plurality of CCs. Note that the congestion information may be information indicating whether each of the plurality of CCs is congested or not. For example, the plurality of CCs includes one or more CCs for the macro cell and/or one or more CCs for the pico cell.

(Communication Control Unit 273)

The communication control unit 273 performs control related to the radio communication in the macro cell 20.

In particular, in the fourth embodiment, on the basis of the above-described congestion information, the communication control unit 273 controls the priorities of the measurements of the above-described plurality of frequency bands (CCs) performed by the UE 100-4.

Determination of Priority

For example, the communication control unit 273 determines the above-described priorities on the basis of the above-described congestion information. More specifically, for example, the communication control unit 273 determines the priorities of the measurements of the above-described plurality of CCs so that CCs with heavier congestions are set with lower priorities and CCs with lighter congestions are set with higher priorities.

Notification of Priority Information

Furthermore, the communication control unit 273 notifies the information (hereinafter, referred to as "priority information") on the priorities of the measurements described above to the UE 100-4 with the signaling in the frequency band (CC) used by the UE 100-4. For example, the above-described CC used by the UE 100-4 is the CC that is used by the UE 100-4 as the PCC, and the above-described signaling is an RRC signaling. In other words, the communication control unit 273 notifies the above-described priority information to the UE 100-4 with the RRC signaling in the PCC of the UE 100-4. Furthermore, the priority information is a list (a whitelist) of the CCs listed in order of priority.

With such a priority control, for example, the UE 100-4 is capable of preferentially performing a measurement of a CC having a lighter congestion (or a CC having no congestion) over a measurement of a CC having a heavier congestion. As a result, there will be a higher possibility of the UE 100-4 performing the random access procedure in the CC with a lighter congestion (or the CC with no congestion) and using the relevant CC. Accordingly, congestion can be restricted without imposing a load on the core network. Furthermore, the priority of measurement can be (upon the notification of the priority information with the RRC signaling, for example) changed in each UE 100 and, accordingly, congestion can be restrained in a further flexible manner.

Note that when there is no priority control as above, the UE 100-4 may only report the measurement result of the CC that is congested. As a result, the UE 100-4 can use only the congested CC.

<6.3 Configuration of UE>

Figure 20:
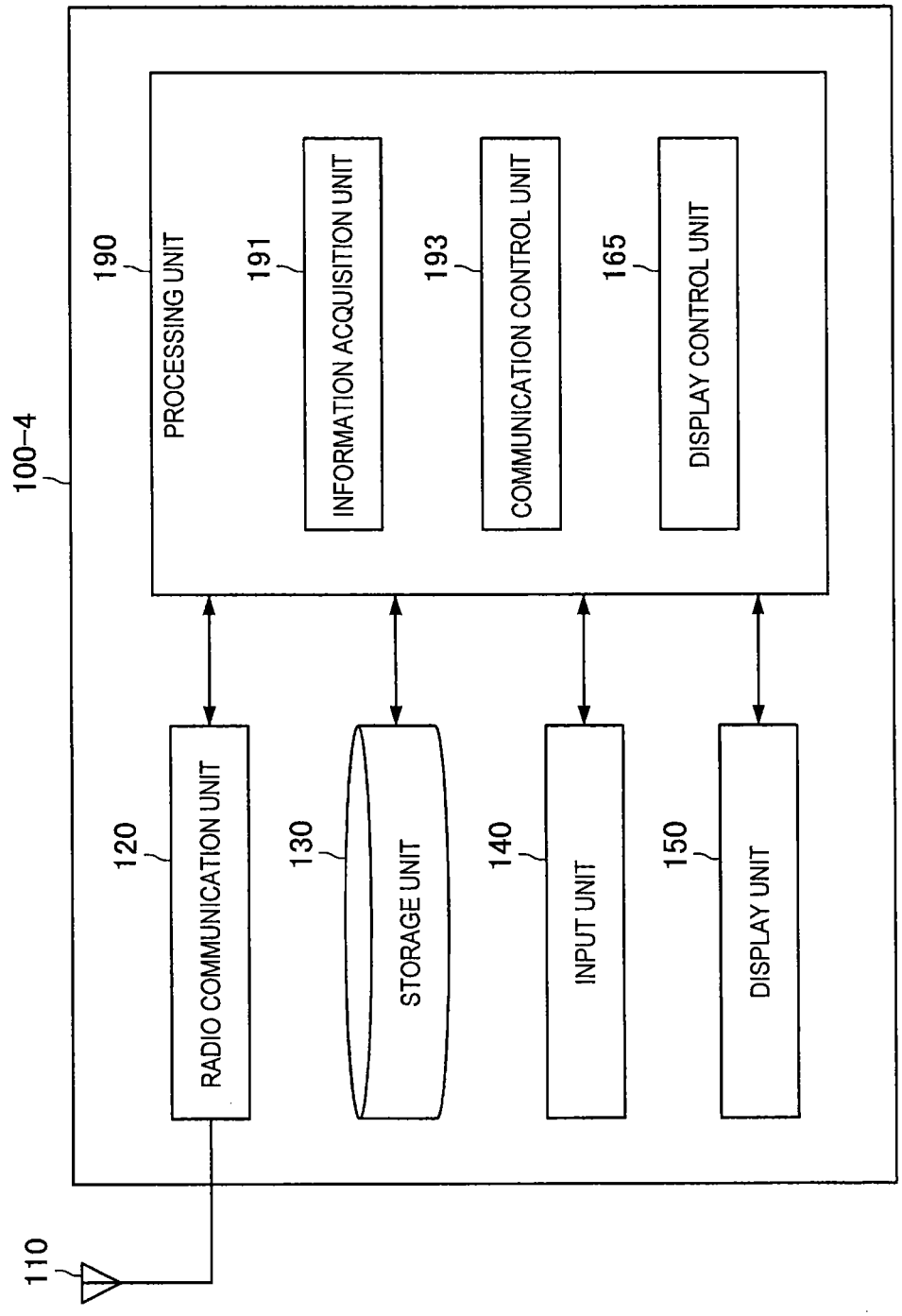
FIG. 20 is a block diagram illustrating an example of the configuration of a macro eNB according to the fourth embodiment.

Next, an example of the configuration of the UE 100-4 according to the fourth embodiment will be described with reference to FIG. 20. FIG. 20 is a block diagram illustrating an example of the configuration of the UE 100-4 according to the fourth embodiment. Referring to FIG. 20, the UE 100-4 includes an antenna unit 110, a radio communication unit 120, a storage unit 130, an input unit 140, a display unit 150, and a processing unit 190.

Here, there is no difference in forms of the antenna unit 110, the radio communication unit 120, the storage unit 130, the input unit 140, the display unit 150, and the display control unit 165 included in a processing unit between the fourth embodiment and the above-described first embodiment. Thus, here, only an information acquisition unit 191 and a communication control unit 193 in a processing unit 190 will be described.

(Information Acquisition Unit 191)

The information acquisition unit 191 acquires information necessary for control by the communication control unit 193. For example, the information acquisition unit 191 acquires information from another device via the radio communication unit 120. For example, the information acquisition unit 191 acquires information stored in the storage unit 130.

In particular, in the fourth embodiment, the information acquisition unit 191 acquires information on the above-described priorities that are priorities of the measurements of the plurality of frequency bands (CCs) performed by the UE 100-4 and that are determined on the basis of the congestion state of each of the above-described plurality of frequency bands (CCs).

As described above, for example, the macro eNB 200-4 notifies the above-described priority information to the UE 100-4 with the RRC signaling in the PCC of the UE 100-4. Then, the information acquisition unit 191 acquires the above-described priority information through the radio communication unit 120. Note that the above-described priority information is a list (a whitelist) of the CCs listed in order of priority.

Furthermore, for example, the information acquisition unit 191 makes the storage unit 130 store the above-described acquired priority information. Then, the information acquisition unit 191 acquires the above-described priority information as required.

(Communication Control Unit 193)

The communication control unit 193 controls radio communication by the UE 100-4.

In particular, in the fourth embodiment, the communication control unit 193 controls the execution of measurements of the above-described plurality of frequency bands (CCs) according to the above-described priorities of the measurements of the plurality of frequency bands (CCs) performed with the UE 100-4.

For example, the communication control unit 193 performs measurement of the plurality of CCs in the order of priority. As an example, the communication control unit 193 measures the RSRP and the RSRQ. Then, the communication control unit 193 reports the measurement result to the macro eNB 200-4 when the measurement results satisfy a predetermined event condition.

With such a measurement control, for example, the UE 100-4 is capable of preferentially performing a measurement of a CC having a lighter congestion (or a CC having no congestion) over a measurement of a CC having a heavier congestion. As a result, there will be a higher possibility of the UE 100-4 performing the random access procedure in the CC with a lighter congestion (or the CC with no congestion) and using the relevant CC. Accordingly, congestion can be restricted without imposing a load on the core network. Furthermore, the priority of measurement can be (upon the notification of the priority information with the RRC signaling, for example) changed in each UE 100 and, accordingly, congestion can be restrained in a further flexible manner.

<6.4 Flow of Process>

Next, examples of the communication control process according to the fourth embodiment will be described with reference to FIGS. 21 and 22.

(First Communication Control Process: Process on Macro eNB Side Related to Control of Priority of Measurement)

Figure 21:
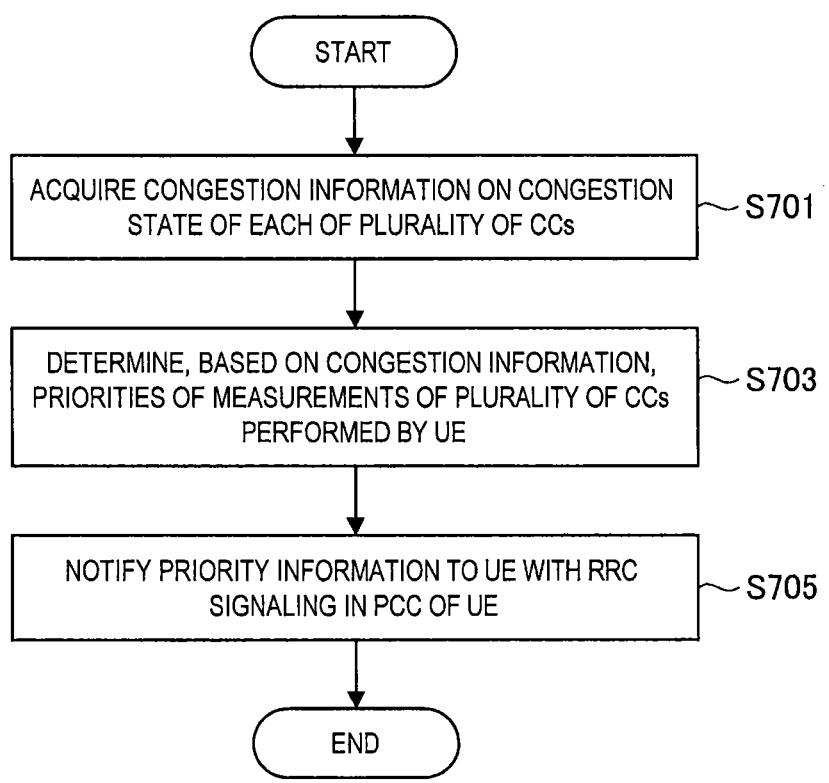
FIG. 21 is a flowchart illustrating an example of a schematic flow of a first communication control process (a process on the macro eNB side related to control of priorities of measurements) according to the fourth embodiment.

FIG. 21 is a flowchart illustrating an example of a schematic flow of a first communication control process (a process on the macro eNB side related to the control of the priorities of the measurements) according to the fourth embodiment.

In step S701, the information acquisition unit 271 acquires congestion information on the congestion state of each of the plurality of frequency bands (CCs).

In step S703, on the basis of the above-described congestion information, the communication control unit 273 determines the priorities of the measurements of the above-described plurality of frequency bands (CCs) performed by the UE 100-4.

In step S705, the communication control unit 273 notifies the above-described information (that is, the priority information) of the priority of the above-described measurement to the UE 100-4 with the RRC signaling in the PCC of the UE 100-4. Then, the process is ended.

(Second Communication Control Process: Process on UE Side Related to Control of Measurement)

Figure 22:
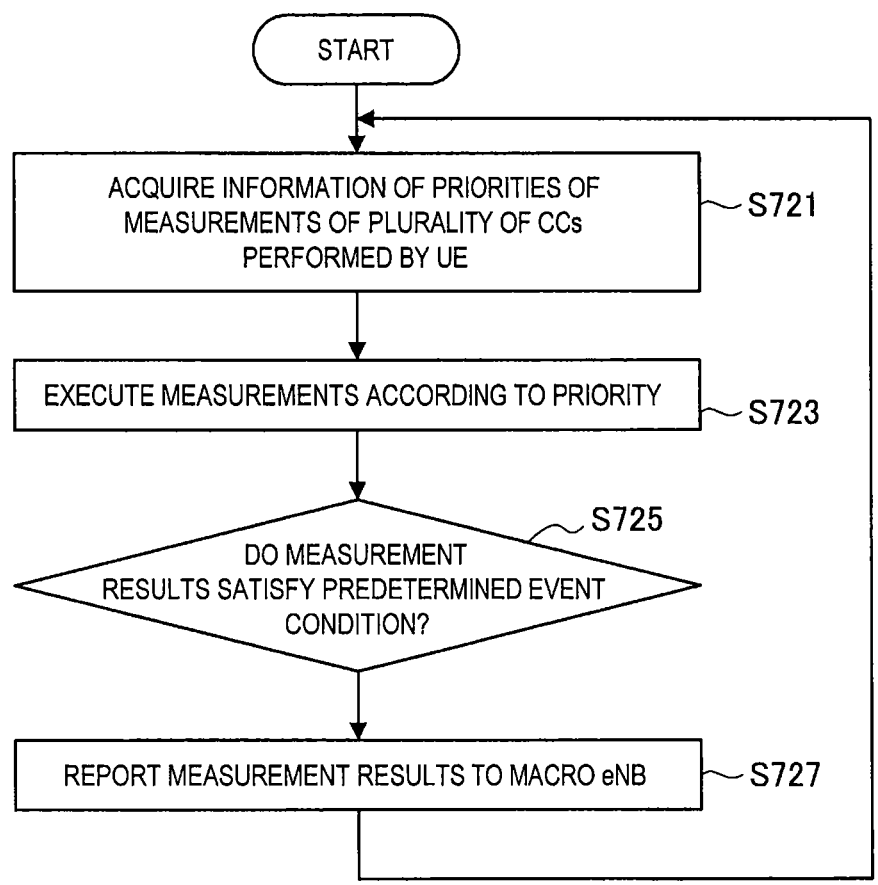
FIG. 22 is a flowchart illustrating an example of a schematic flow of a second communication control process (a process on the UE side related to control of the measurements) according to the fourth embodiment.

FIG. 22 is a flowchart illustrating an example of a schematic flow of a second communication control process (a process on the UE side related to the control of the measurement) according to the fourth embodiment.

In step S721, the information acquisition unit 191 acquires, through the radio communication unit 120, the information (that is, the priority information) on the priorities of the measurements of the plurality of CCs performed by the UE 100-4.

In step S723, the communication control unit 193 performs measurements according to the above-described priorities.

In step S725, the communication control unit 193 determines whether the measurement results satisfy the predetermined event condition. When the predetermined event condition is satisfied, the process proceeds to step S727. If not, the process is ended.

In step S727, the communication control unit 193 reports the above-described measurement result to the macro eNB 200-4. Then, the process returns to step S721.

7. Application Examples

The technology related to the present disclosure can be applied to various products. In addition, the UE 100 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 100 may also be realized as a terminal that conducts machine-to-machine (M2M) communication (also called a machine-type communication (MTC) terminal). Furthermore, at least one of the structural elements of the UE 100 may be realized in a radio communication module mounted onboard these terminals (for example, an integrated circuit module configured on a single die).

For example, the eNB (the macro eNB 200 or the pico eNB 300) may include a body (also referred to as a base station device) controlling radio communication. Further, the eNB (the macro eNB 200 or the pico eNB 300) may further include one or more remote radio heads (RRHs) disposed in different locations from the body. Any of various kinds of terminals to be described above may operate as the eNB (the macro eNB 200 or the pico eNB 300) by performing a base station function temporarily or semipermanently. Furthermore, at least one of the structural elements of the eNB (the macro eNB 200 or the pico eNB 300) may be realized in a base station device or a module for a base station device.

<7.1. Applications Related to eNB>
(First Application)

Figure 23:
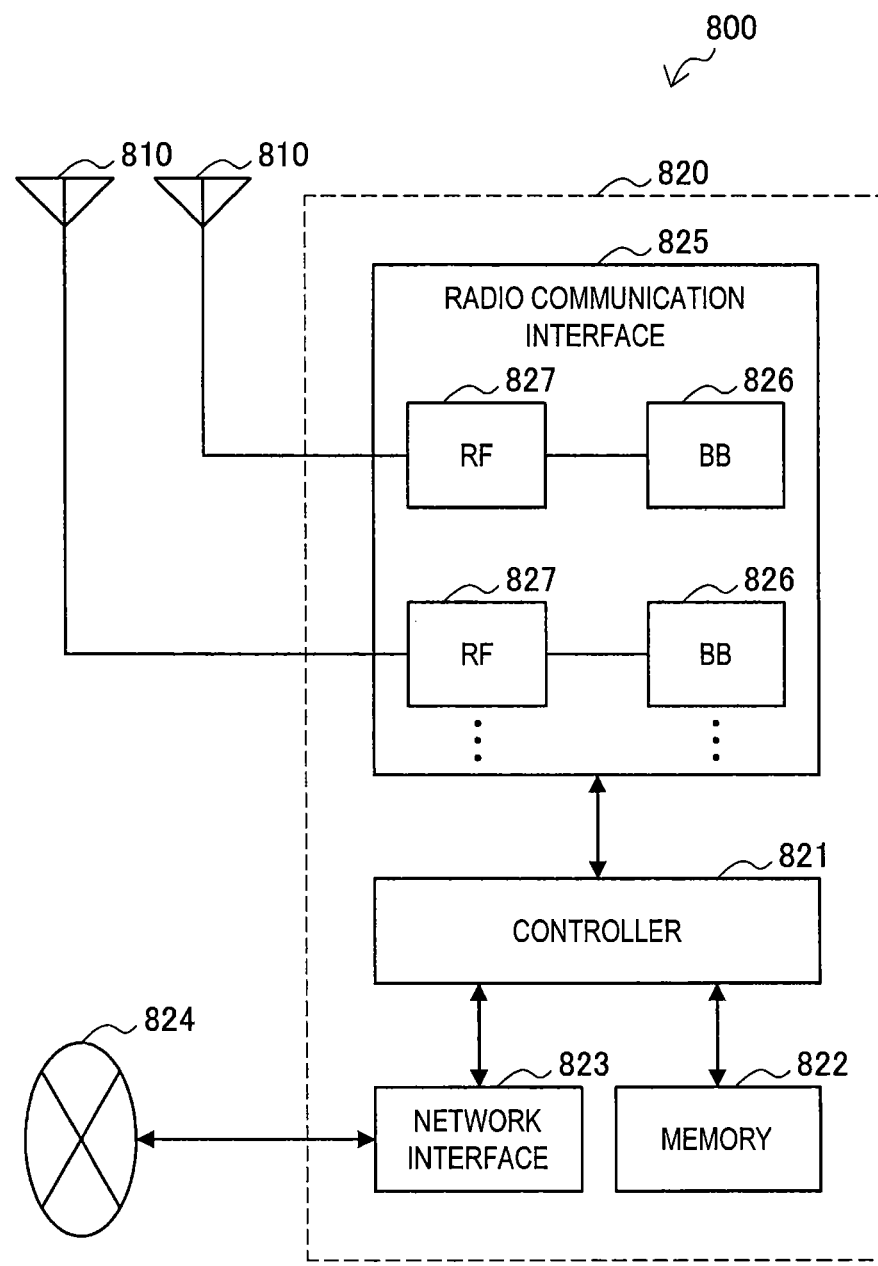
FIG. 23 is a block diagram illustrating a first example of a schematic configuration of an eNB.

FIG. 23 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNB 800 may include multiple antennas 810 as illustrated in FIG. 23, and the multiple antennas 810 may respectively correspond to multiple frequency bands used by the eNB 800, for example. Note that although FIG. 23 illustrates an example of the eNB 800 including multiple antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include multiple BB processors 826 as illustrated in FIG. 23, and the multiple BB processors 826 may respectively correspond to multiple frequency bands used by the eNB 800, for example. In addition, the radio communication interface 825 may also include multiple RF circuits 827 as illustrated in FIG. 23, and the multiple RF circuits 827 may respectively correspond to multiple antenna elements, for example. Note that although FIG. 23 illustrates an example of the radio communication interface 825 including multiple BB processors 826 and multiple RF circuits 827, the radio communication interface 825 may also include a single BB processor 826 or a single RF circuit 827.

In the eNB 800 illustrated in FIG. 23, the information acquisition unit 351 and the communication control unit 353 described with reference to FIG. 5 may be installed in the radio communication interface 825. Alternatively, at least one of the structural elements may be mounted on the controller 821. As one example, in the eNB 800, a module including a part (for example, the BB processor 826) or all of the radio communication interface 825, and/or the controller 821 may be mounted onboard, and the information acquisition unit 351 and the communication control unit 353 may be installed in the module. In this case, the module may store a program causing a processor to function as the information acquisition unit 351 and the communication control unit 353 (in other words, a program causing a processor to execute operations of the information acquisition unit 351 and the communication control unit 353) and executes the program. As another example, a program causing a processor to function as the information acquisition unit 351 and the communication control unit 353 may be installed in the eNB 800, and the radio communication interface 825 (for example, the BB processor 826) and/or the controller 821 may execute the program. As described above, the eNB 800, the base station device 820 or the module may be provided as the device including the information acquisition unit 351 and the communication control unit 353, or a program causing a processor to function as the information acquisition unit 351 and the communication control unit 353 may be provided. A readable recording medium storing the program may be provided. For this point, the information acquisition unit 251 and the communication control unit 253 described with reference to FIG. 10, the information acquisition unit 261 and the communication control unit 263 described with reference to FIG. 15, and the information acquisition unit 271 and the communication control unit 273 described with reference to FIG. 19 are also the same as the information acquisition unit 351 and the communication control unit 353.

In the eNB 800 illustrated in FIG. 23, the radio communication unit 320 described with reference to FIG. 5 may be mounted onboard the radio communication interface 825 (for example, the RF circuit 827). The antenna unit 310 may be mounted onboard the antenna 810. The network communication unit 330 may be mounted onboard the controller 821 and/or the network interface 823. For this point, the antenna unit 210, the radio communication unit 220, and the network communication unit 230 described with reference to FIGS. 10, 15 and 19 are also the same as the antenna unit 310, the radio communication unit 320, and the network communication unit 330.

(Second Application)

Figure 24:
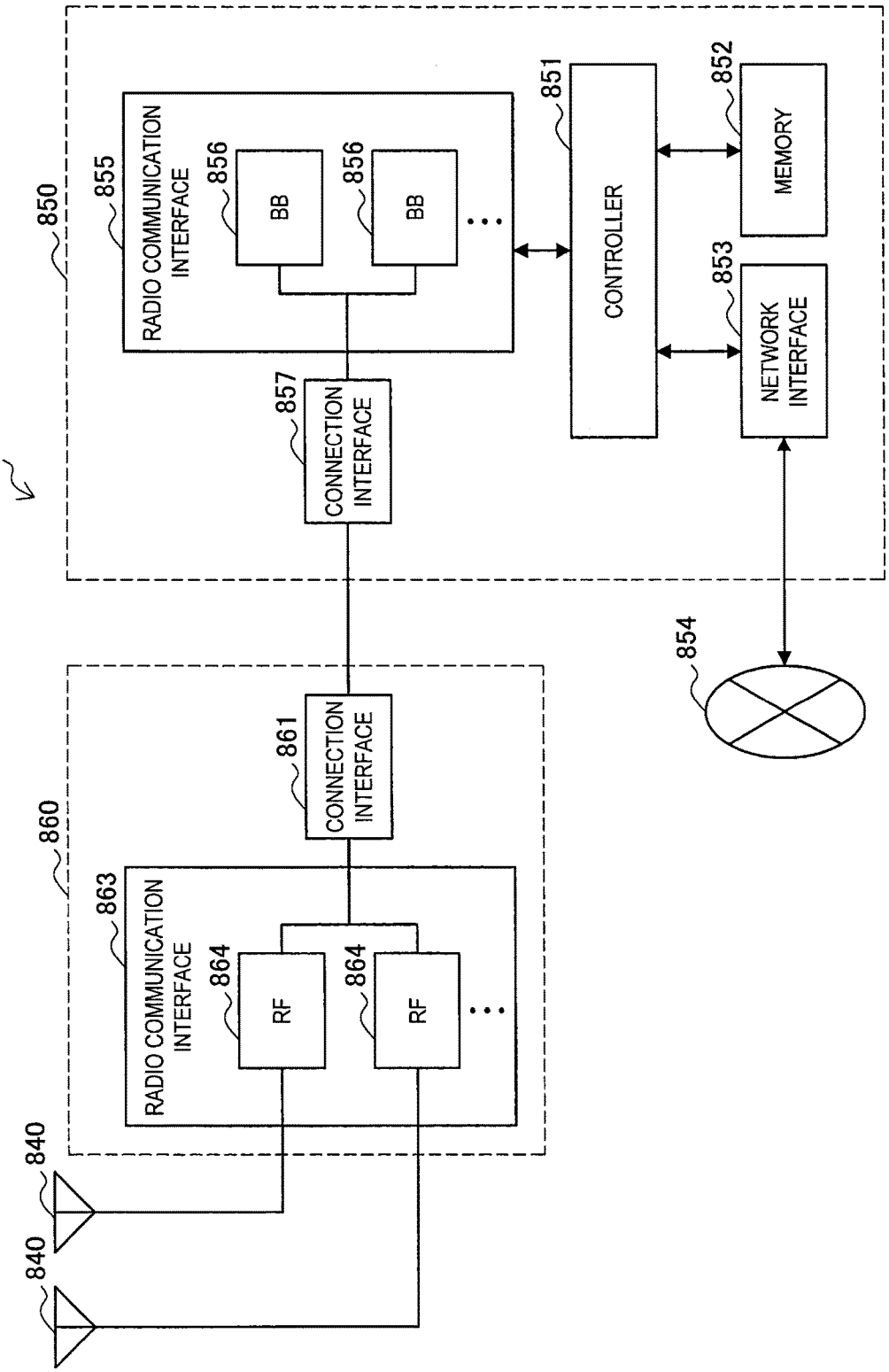
FIG. 24 is a block diagram illustrating a second example of a schematic configuration of an eNB.

FIG. 24 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNB 830 may include multiple antennas 840 as illustrated in FIG. 24, and the multiple antennas 840 may respectively correspond to multiple frequency bands used by the eNB 830, for example. Note that although FIG. 24 illustrates an example of the eNB 830 including multiple antennas 840, the eNodeB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 23.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 23, except for being connected to an RF circuit 864 of the RRH 860 via the connection interface 857. The radio communication interface 855 may also include multiple BB processors 856 as illustrated in FIG. 24, and the multiple BB processors 856 may respectively correspond to multiple frequency bands used by the eNB 830, for example. Note that although FIG. 24 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include multiple RF circuits 864 as illustrated in FIG. 33, and the multiple RF circuits 864 may respectively correspond to multiple antenna elements, for example. Note that although FIG. 33 illustrates an example of the radio communication interface 863 including multiple RF circuits 864, the radio communication interface 863 may also include a single RF circuit 864.

In the eNB 830 illustrated in FIG. 24, the information acquisition unit 351 and the communication control unit 353 described with reference to FIG. 5 may be installed in the radio communication interface 855 and/or the radio communication interface 863. Alternatively, at least one of the structural elements may be mounted on the controller 851. As one example, in the eNB 830, a module including a part (for example, the BB processor 856) or all of the radio communication interface 855 and/or the controller 851 may be mounted onboard, and the information acquisition unit 351 and the communication control unit 353 may be installed in the module. In this case, the module may store a program causing a processor to function as the information acquisition unit 351 and the communication control unit 353 (in other words, a program causing a processor to execute operations of the information acquisition unit 351 and the communication control unit 353) and executes the program. As another example, a program causing a processor to function as the information acquisition unit 351 and the communication control unit 353 may be installed in the eNB 830, and the radio communication interface 855 (for example, the BB processor 856) and/or the controller 851 may execute the program. As described above, the eNB 830, the base station device 850 or the module may be provided as the device including the information acquisition unit 351 and the communication control unit 353, or a program causing a processor to function as the information acquisition unit 351 and the communication control unit 353 may be provided. A readable recording medium storing the program may be provided. For this point, the information acquisition unit 251 and the communication control unit 253 described with reference to FIG. 10, the information acquisition unit 261 and the communication control unit 263 described with reference to FIG. 15, and the information acquisition unit 271 and the communication control unit 273 described with reference to FIG. 19 are also the same as the information acquisition unit 351 and the communication control unit 353.

In the eNB 830 illustrated in FIG. 24, the radio communication unit 320 described with reference to FIG. 5 may be mounted onboard the radio communication interface 863 (for example, the RF circuit 864). The antenna unit 310 may be mounted onboard the antenna 840. The network communication unit 330 may be mounted onboard the controller 851 and/or the network interface 853. For this point, the antenna unit 210, the radio communication unit 220, and the network communication unit 230 described with reference to FIGS. 10, 15 and 19 are also the same as the antenna unit 310, the radio communication unit 320, and the network communication unit 330.

<7.2. Applications Related to UE>

(First Application)

Figure 25:
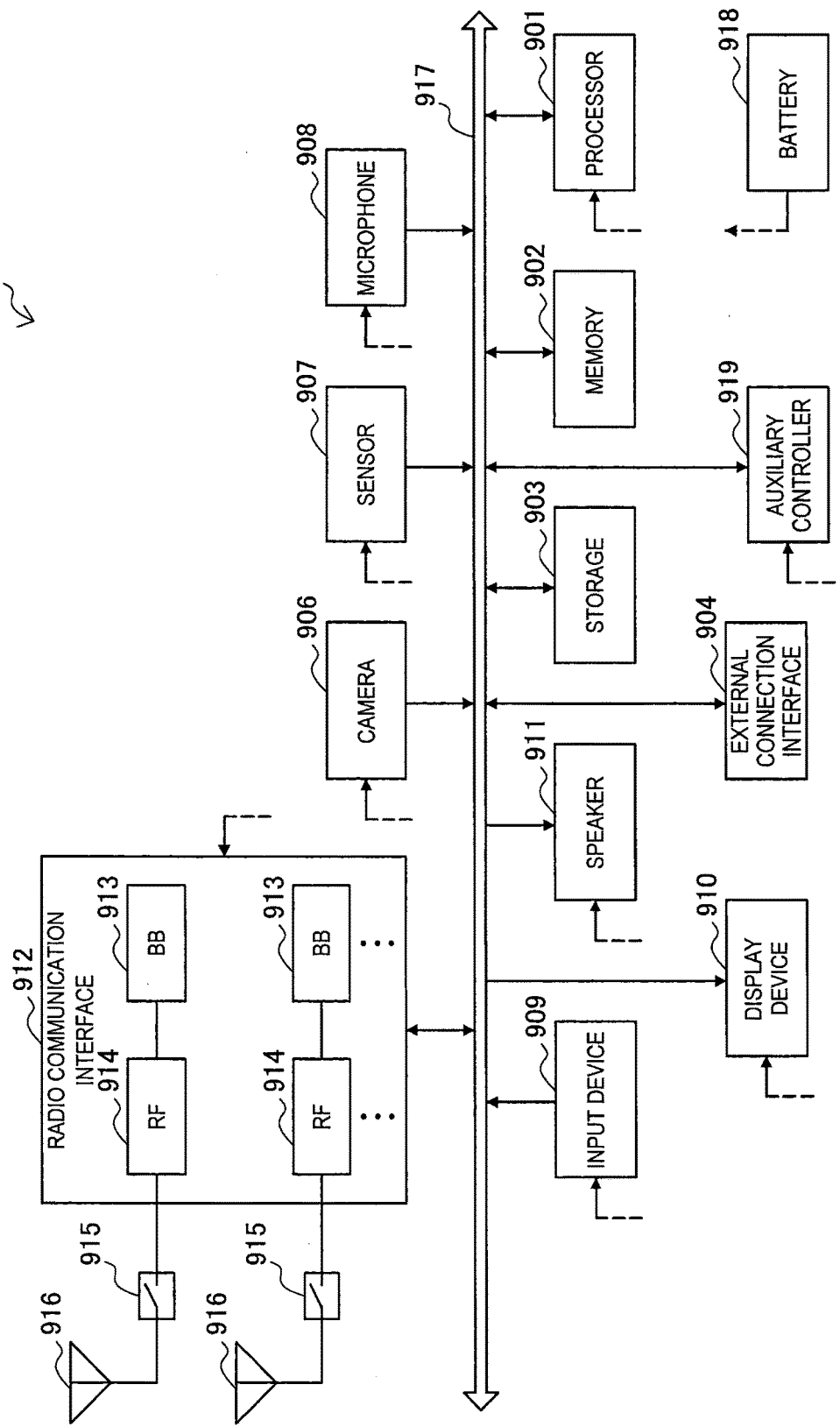
FIG. 25 is a block diagram illustrating an example of a schematic configuration of a smartphone.

FIG. 25 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900.

The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 25. Note that although FIG. 25 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 25. Note that although FIG. 25 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 25 via power supply lines partially illustrated with dashed lines in the drawing. The auxiliary controller 919 causes minimal functions of the smartphone 900 to operate while in a sleep mode, for example.

In the smartphone 900 illustrated in FIG. 25, the information acquisition unit 161 and the communication control unit 163 described with reference to FIG. 4 may be installed in the radio communication interface 912. Alternatively, at least one of the structural elements may be mounted on the processor 901 or the auxiliary controller 919. As one example, in the smartphone 900, a module including a part (for example, the BB processor 913) or all of the radio communication interface 912, the processor 901, and/or the auxiliary controller 919 may be mounted onboard, and the information acquisition unit 161 and the communication control unit 163 may be installed in the module. In this case, the module may store a program causing a processor to function as the information acquisition unit 161 and the communication control unit 163 (in other words, a program causing a processor to execute operations of the information acquisition unit 161 and the communication control unit 163) and executes the program. As another example, a program causing a processor to function as the information acquisition unit 161 and the communication control unit 163 may be installed in the smartphone 900, and the radio communication interface 912 (for example, the BB processor 913), the processor 901, and/or the auxiliary controller 919 may execute the program. As described above, the smartphone 900 or the module may be provided as the device including the information acquisition unit 161 and the communication control unit 163, or a program causing a processor to function as the information acquisition unit 161 and the communication control unit 163 may be provided. A readable recording medium storing the program may be provided. For this point, the information acquisition unit 171 and the communication control unit 173 described with reference to FIG. 9, the information acquisition unit 181 and the communication control unit 183 described with reference to FIG. 14, and the information acquisition unit 191 and the communication control unit 193 described with reference to FIG. 20 are also the same as the information acquisition unit 161 and the communication control unit 163.

In the smartphone 900 illustrated in FIG. 25, for example, the radio communication unit 320 described with reference to FIG. 4 may be mounted onboard the radio communication interface 120 (for example, the RF circuit 914). The antenna unit 110 may be mounted onboard the antenna 916.

(Second Application)

Figure 26:
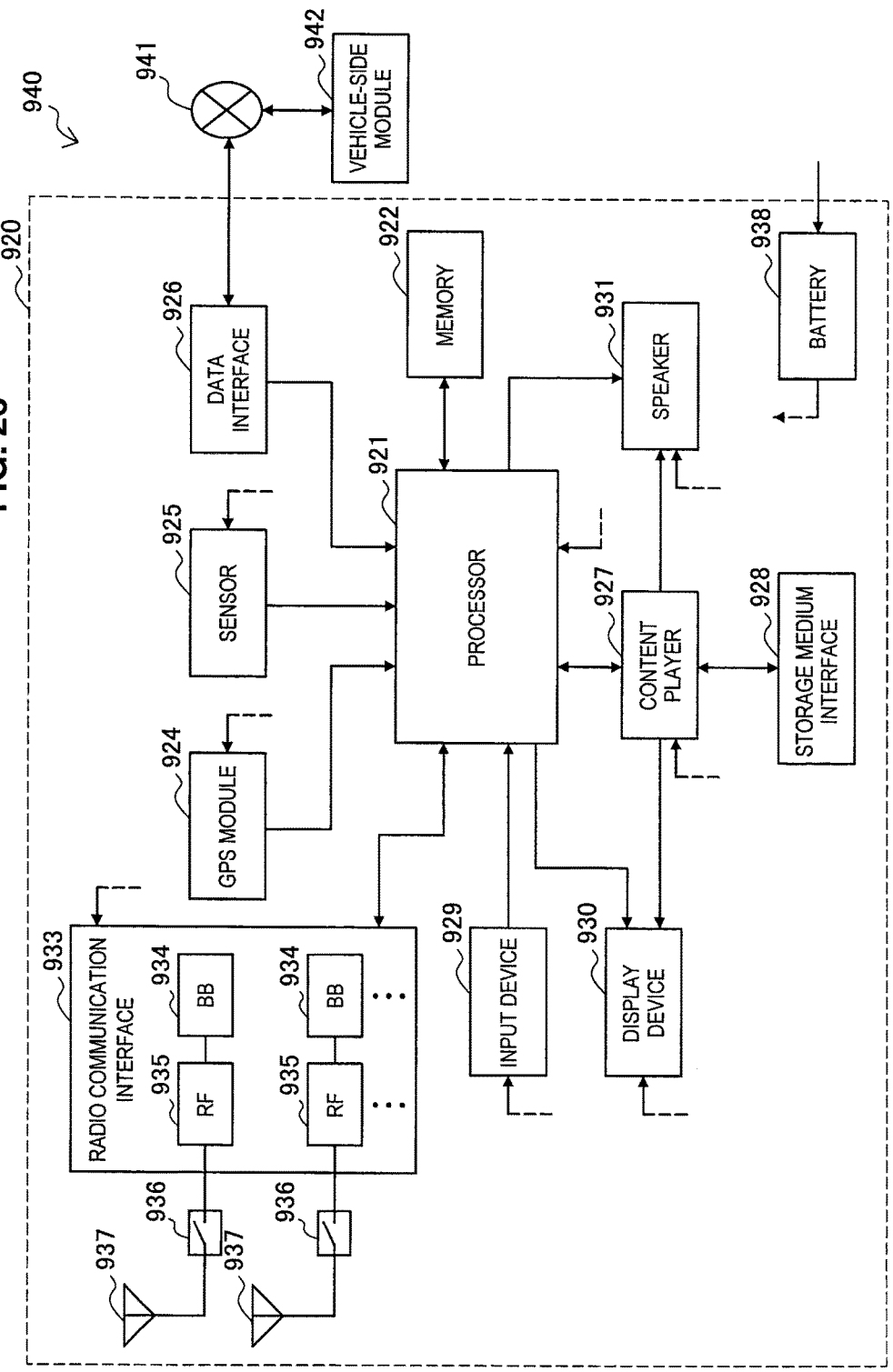
FIG. 26 is a block diagram illustrating an example of a schematic configuration of a car navigation apparatus.

FIG. 26 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 26. Note that although FIG. 26 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 26. Note that although FIG. 26 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 26 via power supply lines partially illustrated with dashed lines in the drawing. Also, the battery 938 stores electric power supplied from the vehicle.

In the car navigation device 920 illustrated in FIG. 26, the information acquisition unit 161 and the communication control unit 163 described with reference to FIG. 4 may be installed in the radio communication interface 933. Alternatively, at least one of the structural elements may be mounted on the processor 921. As one example, in the car navigation device 920, a module including a part (for example, the BB processor 934) or all of the radio communication interface 933 and/or the processor 921 may be mounted onboard, and the information acquisition unit 161 and the communication control unit 163 may be installed in the module. In this case, the module may store a program causing a processor to function as the information acquisition unit 161 and the communication control unit 163 (in other words, a program causing a processor to execute operations of the information acquisition unit 161 and the communication control unit 163) and executes the program. As another example, a program causing a processor to function as the information acquisition unit 161 and the communication control unit 163 may be installed in the car navigation device 920, and the radio communication interface 933 (for example, the BB processor 934) and/or the processor 921 may execute the program. As described above, the car navigation device 920 or the module may be provided as the device including the information acquisition unit 161 and the communication control unit 163, or a program causing a processor to function as the information acquisition unit 161 and the communication control unit 163 may be provided. A readable recording medium storing the program may be provided. For this point, the information acquisition unit 171 and the communication control unit 173 described with reference to FIG. 9, the information acquisition unit 181 and the communication control unit 183 described with reference to FIG. 14, and the information acquisition unit 191 and the communication control unit 193 described with reference to FIG. 20 are also the same as the information acquisition unit 161 and the communication control unit 163.

In the car navigation device 920 illustrated in FIG. 26, for example, the radio communication unit 120 described with reference to FIG. 4 may be mounted onboard the radio communication interface 933 (for example, the RF circuit 935). The antenna unit 110 may be mounted onboard the antenna 937.

In addition, technology according to the present disclosure may also be realized as an in-vehicle system (or vehicle) 940 that includes one or more blocks of the car navigation device 920 discussed above, the in-vehicle network 941, and a vehicle-side module 942. That is, the in-vehicle system (or vehicle) 940 may be provided as a device including the information acquisition unit 161 and the communication control unit 163 (or the information acquisition unit 171 and the communication control unit 173, the information acquisition unit 181 and the communication control unit 183, or the information acquisition unit 191 and the communication control unit 193). The vehicle-side module 942 generates vehicle-side data such as the vehicle speed, number of engine revolutions, or malfunction information, and outputs the generated data to the in-vehicle network 941.

8. Conclusion

The UE 100, the macro eNB 200, and the pico eNB 300 and each process according to the embodiments of the present disclosure have been described with reference to FIGS. 3 to 24.

First Embodiment

According to the first embodiment, the UE 100-1 performs an access procedure to connect to the pico eNB 300-1 when not connected to any of the eNBs.

With the above, the UE 100-1 is connected to the pico eNB 300-1 first. Accordingly, the network side can determine the UE 100-1 that is to be connected to the macro eNB 200. Accordingly, connection of the UE 100-1 to the macro eNB 200 can be restricted. Furthermore, with the restriction, the increase in signaling in the CCs of the macro cell 20 for establishing a connection is suppressed and, as a result, the increase in load on the macro eNB 200 can be suppressed. As described above, the first embodiment is capable of suppressing increase in load on the macro eNB 200.

Second Embodiment

According to the second embodiment, when the UE 100-2 is not connected to any of the eNBs, in the access procedure with the eNB (in particular, the macro eNB 200-2), the UE 100-2 provides a message including the information according to the state of the UE 100-2 to the above-described eNB. Meanwhile, the macro eNB 200-2 determines whether to permit the connection of the UE 100-2 on the basis of the above-described information according to the state of the UE 100-2.

With the above, taking the state of the UE 100-2 into consideration, the network side can determine the UE 100-2 that is to be connected to the macro eNB 200-2. Accordingly, the access procedure (or the process of establishing a connection) of the UE 100-2 that is not connected to the macro eNB 200-2 can be aborted. Furthermore, with the abortion, the increase in signaling for establishing connections in the CCs of the macro cell 20 is suppressed and, as a result, the increase in load on the macro eNB 200-2 can be suppressed. As described above, the second embodiment is capable of suppressing increase in load on the macro eNB 200-2.

For example, the UE 100-2 in which connection to the macro eNB 200-2 is effective can be connected to the macro eNB 200-2. Specifically, for example, the UE 100-2 in which using the CC for the macro cell as the PCC is effective can be made to use the CC for the macro cell as the PCC.

Third Embodiment

According to the third embodiment, in the access procedure for connecting to the eNB (in particular, the macro eNB 200-3), the UE 100-3 provides a message including device information that indicates that the UE 100-3 is a device (an MTC device) that performs machine type communication with the above-described eNB. Meanwhile, in the access procedure for connecting to the UE 100-3, when the above-described device information is provided, the macro eNB 200-3 determines that the above-described connection of the UE 100-3 is not to be permitted.

Accordingly, the access procedure (or the process of establishing a connection) of the UE 100-3 that is the MTC device can be aborted. Furthermore, with the abortion, the increase in signaling for establishing connections in the CCs of the macro cell 20 is suppressed and, as a result, the increase in load on the macro eNB 200-3 can be suppressed. As described above, the third embodiment is capable of suppressing increase in load, owing to the MTC device, on the macro eNB 200-3.

Fourth Embodiment

According to the fourth embodiment, on the basis of congestion information on the congestion of each of the plurality of CCs, the eNB (macro eNB 200-4 and/or the pico eNB 300-4) controls the priorities of measurements of the above-described plurality of CCs performed by the UE 100-4. Meanwhile, the UE 100-4 controls the execution of the measurements of the above-described plurality of CCs according to the above-described priorities.

With the above, for example, the UE 100-4 is capable of preferentially performing a measurement of a CC having a lighter congestion (or a CC having no congestion) over a measurement of a CC having a heavier congestion. As a result, there will be a higher possibility of the UE 100-4 performing the random access procedure in the CC with a lighter congestion (or the CC with no congestion) and using the relevant CC. Accordingly, congestion can be restricted without imposing a load on the core network. Furthermore, the priority of measurement can be changed in each UE 100-4 and, accordingly, congestion can be restrained in a further flexible manner.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the eNB has been described as one communication control device, but the eNB according to an embodiment of the present disclosure is not limited thereto. The eNB may include a plurality of devices. For example, the eNB may include an antenna device including an antenna unit, a radio communication device including a radio communication unit, and a communication control device including a storage unit and a processing unit.

The example in which the eNB (pico eNB) of a small cell is an independent complete base station has been described, but the eNB of a small cell according to an embodiment of the present disclosure is not limited thereto. For example, the eNB of a small cell may be a remote radio head (RRH). The RRH may mainly include an analog signal processing portion and an antenna portion and may be extended from a device (for example, a macro eNB) in a remote place using an optical fiber. In this case, a communication control function (information acquisition unit and a communication control unit) for a small cell (pico cell) may be mounted onboard the device (for example, a macro eNB) in the remote place.

The pico cell has been described as an example of a small cell, but an embodiment of the present disclosure is not limited thereto. For example, the small cell may be a cell which has another name and partially or entirely overlaps with a macro cell. For example, the small cell may be a micro cell or a femto cell instead of the pico cell.

In the foregoing embodiments, the example in which the communication system is a system conforming to LTE or LTE-A has been described, but an embodiment of the present disclosure is not limited thereto. For example, the communication system may be a system conforming to another communication standard. In this case, the UE may be another terminal device and the eNB may be another base station. The component carriers (CCs) may be other frequency bands.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

A computer causing the processor (for example, a CPU or a DSP) included in the devices (the UE, the macro eNB or the pico eNB) of the present specification to function as the structural elements (for example, the information acquisition unit and the communication control unit) of the device program (in other words, a computer program causing the processor to execute the operations of the structural elements of the device) can also be created. A recording medium that records the computer program may also be provided. A device (for example, a finished product or a module (a component, a processing circuit, or a chip, or the like) for a finished product) including a memory storing the computer program and one or more processors capable of executing the computer program may also be provided. A method including the operations of the structural elements (for example, the information acquisition unit and the communication control unit) of the device may also be included in a technology according to an embodiment of the present disclosure.

Additionally, the present technology may also be configured as below.

(1)

A terminal device including:

an acquisition unit configured to acquire information on a small cell, a portion of or an entirety of the small cell overlapping a macro cell, and the macro cell; and a communication control unit configured to perform an access procedure for connection to a base station of the small cell when the terminal device is not connected to any base station.

(2)

The terminal device according to (1), wherein the communication control unit provides information according to a state of the terminal device to the base station of the small cell after the terminal device is connected to the base station of the small cell.

(3)

The terminal device according to (1), wherein the terminal device is a device that is configured to perform machine type communication.

(4)

A terminal device including:

an acquisition unit configured to acquire information according to a state of the terminal device; and a communication control unit configured to, in an access procedure for connection to a base station, provide a message including the information to the base station when the terminal device is not connected to any base station.

(5)

The terminal device according to (4), wherein the information included in the message is information used to determine whether to permit connection with the base station.

(6)

The terminal device according to (4), wherein the message is, in the access procedure, a message in layer 2 or layer 3 of a communication protocol.

(7)

The terminal device according to any one of (4) to (6), wherein the base station is a base station of a macro cell that partially or entirely overlaps a small cell.

(8)

The terminal device according to any one of (2) to (7), wherein the information according to the state of the terminal device is information including a movement state of the terminal device.

(9)

The terminal device according to any one of (2) to (8), wherein the information according to the state of the terminal device is information including a request of the terminal device related to radio communication.

(10)

The terminal device according to (9), wherein the information on the request includes information of a number of frequency bands that the terminal device uses for the radio communication or information of a throughput in the radio communication of the terminal device.

(11)

The terminal device according to any one of (1) to (10), wherein the terminal device is a device that is configured to perform machine type communication, and wherein, in the access procedure for connection to the base station, the communication control unit provides, to the base station, a message including device information that indicates that the terminal device is a device that performs machine type communication.

(12)

The terminal device according to (11), wherein the base station to which the message including the device information is provided is a base station of a macro cell that partially or entirely overlaps the small cell.

(13)

The terminal device according to (11) or (12), wherein when the base station to which the message including the device information is provided is a base station of a macro cell that partially or entirely overlaps the small cell, connection to the base station is not permitted.

(14)

A communication control device including:

an acquisition unit configured to, in an access procedure for connection to a terminal device, when a message including information according to a state of the terminal device is provided by the terminal device, acquire the information; and a communication control unit configured to determine whether to permit connection of the terminal device on a basis of the information.

(15)

The communication control device according to (14), wherein, in the access procedure for connection to the terminal device, when a message including device information indicating that the terminal device is a device that is configured to perform a machine type communication is provided by the terminal device, the communication control unit determines not to permit the connection of the terminal device.

(16)

A communication control method including:

acquiring, in an access procedure for connection to a terminal device, when a message including information according to a state of the terminal device is provided by the terminal device, the information; and determining whether to permit connection of the terminal device on a basis of the information.

(17)

A communication control device including:

an acquisition unit configured to acquire congestion information on a congestion state of each of a plurality of frequency bands; and a communication control unit configured to, on a basis of the congestion information, control priorities of measurements of the plurality of frequency bands performed by the terminal device.

(18)

The communication device according to (17), wherein the communication control unit determines the priorities on a basis of the congestion information and notifies, to the terminal device, the information on the priorities with signaling in the frequency band used by the terminal device.

(19)

A communication control method including:

acquiring congestion information on a congestion state of each of a plurality of frequency bands; and controlling, on a basis of the congestion information, priorities of measurements of the plurality of frequency bands performed by the terminal device.

(20)

A terminal device including:

an acquisition unit configured to acquire information on priorities that are priorities of measurements of a plurality of frequency bands performed by the terminal device and that are determined on a basis of a congestion state of each of the plurality of frequency bands; and a communication control unit configured to control execution of the measurements of the plurality of frequency bands in accordance with the priorities.

(21)

An information processing device that controls a terminal device, the information processing device including:

a memory configured to store a predetermined memory; and one or more processors capable of executing the predetermined program, wherein the predetermined program is a program that causes acquiring information on a small cell, a portion of or an entirety of the small cell overlapping a macro cell, and the macro cell, and performing an access procedure for connection to a base station of the small cell when the terminal device is not connected to any base station.

(22)

An information processing device that controls a terminal device, the information processing device including:

a memory configured to store a predetermined memory; and one or more processors capable of executing the predetermined program, wherein the predetermined program is a program that causes acquiring information according to a state of the terminal device, and in an access procedure for connection to a base station, providing a message including the information to the base station when the terminal device is not connected to any base station.

(23)

An information processing device that controls a terminal device, the information processing device including:

a memory configured to store a predetermined memory; and one or more processors capable of executing the predetermined program, wherein the predetermined program is a program that causes acquiring information on priorities that are priorities of measurements of a plurality of frequency bands performed by the terminal device and that are determined on a basis of a congestion state of each of the plurality of frequency bands, and controlling execution of the measurements of the plurality of frequency bands in accordance with the priorities.

REFERENCE SIGNS LIST 1 communication system
20 macro cell
30 pico cell
100 user equipment (UE)
161, 171, 181, 191 information acquisition unit
163, 173, 183, 193 communication control unit
200 macro evolved Node B (eNB)
251, 261, 271 information acquisition unit
253, 263, 273 communication control unit 300 pico evolved Node B (eNB)
351 information acquisition unit
353 communication control unit

The invention claimed is:

1. A terminal device comprising:

processing circuitry configured to acquire information on a small cell, a portion of or an entirety of the small cell overlapping a macro cell, and the macro cell;

perform an access procedure for connection to a base station of the small cell when the terminal device is not connected to any base station;

provide information according to a state of the terminal device to the base station of the small cell after the terminal device is connected to the base station of the small cell, the information according to the state of the terminal device including information regarding moving speed of the terminal device;

determine whether the moving speed of the terminal device exceeds a predetermined speed; and determine whether a number of component carriers requested by the terminal device exceeds a predetermined number in case it is determined that the moving speed of the terminal device exceeds the predetermined speed.

2. The terminal device according to claim 1, wherein the terminal device is a device that is configured to perform machine type communication.

3. The terminal device according to claim 1, wherein the information according to the state of the terminal device including a request of the terminal device related to radio communication.

4. The terminal device according to claim 3, wherein the request includes information of a number of frequency bands that the terminal device uses for the radio communication or information of a throughput in the radio communication of the terminal device.

5. The terminal device according to claim 1, wherein the terminal device is a device that is configured to perform machine type communication, and wherein, in the access procedure for connection to the base station, the processing circuitry provides, to the base station, a message including device information that indicates that the terminal device is a device that performs machine type communication.

6. The terminal device according to claim 5, wherein the base station to which the message including the device information is provided is a base station of a macro cell that partially or entirely overlaps the small cell.

7. The terminal device according to claim 5, wherein when the base station to which the message including the device information is provided is a base station of a macro cell that partially or entirely overlaps the small cell, connection to the base station is not permitted.

8. The terminal device according to claim 1, wherein the processing circuitry is further configured to:

acquire information on priorities that are priorities of measurements of a plurality of frequency bands performed by the terminal device and that are determined on a basis of a congestion state of each of the plurality of frequency bands; and control execution of the measurements of the plurality of frequency bands in accordance with the priorities.

9. The terminal device according to claim 1, wherein the processing circuitry is further configured to:

determine whether there is an instruction on handover to the macro cell; and execute handover to the macro cell in case it is determined that there is the instruction.

10. The terminal device according to claim 1, wherein the processing circuitry is further configured to:

determine whether there is an instruction on handover to the macro cell; and continue radio communication in the small cell in case it is determined that there is no instruction on handover to the macro cell.

11. The terminal device according to claim 1, wherein the processing circuitry is further configured to execute handover to the macro cell in case it is determined that the number of component carriers requested by the terminal device exceeds the predetermined number.

12. A terminal device comprising:

processing circuitry configured to acquire information according to a state of the terminal device;

in an access procedure for connection to a base station, provide a message including the information according to the state of the terminal device to the base station when the terminal device is not connected to any base station, the information according to the state of the terminal device including information regarding moving speed of the terminal device;

determine whether the moving speed of the terminal device exceeds a predetermined speed; and determine whether a number of component carriers requested by the terminal device exceeds a predetermined number in case it is determined that the moving speed of the terminal device exceeds the predetermined speed.

13. The terminal device according to claim 12, wherein the information according to the state of the terminal device included in the message is information used to determine whether to permit connection with the base station.

14. The terminal device according to claim 12, wherein the message is, in the access procedure, a message in layer 2 or layer 3 of a communication protocol.

15. The terminal device according to claim 12, wherein the base station is a base station of a macro cell that partially or entirely overlaps a small cell.

* * * * *